United States Patent
Yamamoto

(10) Patent No.: US 6,865,956 B2
(45) Date of Patent: Mar. 15, 2005

(54) ELECTROMAGNETIC FLOWMETER

(75) Inventor: Tomoshige Yamamoto, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/490,570

(22) PCT Filed: Sep. 20, 2002

(86) PCT No.: PCT/JP02/09679

§ 371 (c)(1),
(2), (4) Date: Mar. 19, 2004

(87) PCT Pub. No.: WO03/027614

PCT Pub. Date: Apr. 3, 2003

(65) Prior Publication Data

US 2004/0255691 A1 Dec. 23, 2004

(30) Foreign Application Priority Data

Sep. 20, 2001 (JP) ........................................ 2001-286557

(51) Int. Cl.⁷ .............................................. G01F 1/58
(52) U.S. Cl. ................................................ 73/861.12
(58) Field of Search ............................. 73/861, 861.08, 73/861.11, 861.12, 861.13, 861.14, 861.15

(56) References Cited

U.S. PATENT DOCUMENTS 6,634,238 B2 * 10/2003 Budmiger ................ 73/861.17

FOREIGN PATENT DOCUMENTS

JP          53-017762 A       2/1978
JP          55-149012 A       11/1980

* cited by examiner

*Primary Examiner*—Edward Lefkowitz
*Assistant Examiner*—Corey D. Mack
(74) *Attorney, Agent, or Firm*—Blakely Sokoloff Taylor & Zafman

(57) ABSTRACT

When a plane (PLN) which includes electrodes (2a, 2b) and is perpendicular to the direction of an axis (PAX) of a measuring pipe (1) is defined as a boundary in the measuring pipe (1), an exciting coil (3) applies asymmetrical magnetic fields to a fluid to be measured, which flows through the measuring pipe (1), on both sides of the plane (PLN) serving as the boundary in the measuring pipe (1). A signal conversion unit (5) obtains the phase difference between an exciting current supplied to the exciting coil (3) and an inter-electrode electromotive force detected by the electrodes (2a, 2b). A flow rate output unit (6) calculates the flow rate of the fluid on the basis of the phase difference obtained by the signal conversion unit (5).

25 Claims, 21 Drawing Sheets

ELECTROMAGNETIC FLOWMETER

The present patent application is a non-provisional National Stage application of International Application No. PCT/JP02/09679, filed Sep. 20, 2002.

BACKGROUND OF THE INVENTION

The present invention relates to an electromagnetic flowmeter which measures the flow rate of a fluid to be measured, which flows through a measuring pipe and, more particularly, to an exciting method and signal processing method capable of realizing accurate flow rate measurement.

An electromagnetic flowmeter measures the flow rate of a conductive fluid to be measured, which flows through a measuring pipe, by converting the flow rate into an electrical signal by using electromagnetic induction. FIG. 25 shows the arrangement of a conventional electromagnetic flowmeter. This electromagnetic flowmeter has a measuring pipe 11, a pair of electrodes 12a and 12b, an exciting coil 13, a signal conversion unit 15, and a flow rate output unit 16. A fluid to be measured flows through the measuring pipe 11. The pair of electrodes 12a and 12b oppose each other in the measuring pipe 11 to be perpendicular to both the magnetic field applied to the fluid to be measured and an axis PAX of the measuring pipe 11 and also come into contact with the fluid to be measured. The electrodes 12a and 12b detect an electromotive force generated by the magnetic field and the flow of the fluid to be measured. The exciting coil 13 applies, to the fluid to be measured, a magnetic field perpendicular to both the measuring pipe axis PAX and an electrode axis EAX that connects the electrodes 12a and 12b. The signal conversion unit 15 detects the electromotive force between the electrodes 12a and 12b. The flow rate output unit 16 calculates the flow rate of the fluid to be measured on the basis of the interelectrode electromotive force detected by the signal conversion unit 15.

In the electromagnetic flowmeter shown in FIG. 25, a plane PLN which includes the electrodes 12a and 12b and is perpendicular to the direction of the measuring pipe axis PAX is defined as a boundary in the measuring pipe 11. At this time, symmetrical magnetic fields are applied to the fluid to be measured on both sides of the plane PLN, i.e., the boundary in the measuring pipe 11. The exciting coil 13 can be excited by a sine wave exciting method capable of high-frequency excitation or a rectangular wave exciting method which is not affected by electromagnetic induction noise.

The sine wave exciting method that uses a sine wave as an exciting current for an exciting coil is readily affected by commercial frequency noise. However, this problem can be solved by a high-frequency exciting method which uses an exciting current having a higher frequency. The high-frequency exciting method is resistant to 1/f noise such as electrochemical noise or spike noise. In addition, this method can improve the response (a characteristic which makes a flow rate signal quickly follow a change in flow rate).

However, the conventional sine wave exciting method is readily affected by in-phase component noise. An example of in-phase component noise is a shift of the amplitude of a magnetic field applied to a fluid to be measured. In the conventional electromagnetic flowmeter, when the amplitude of the exciting current supplied to the exciting coil varies (shifts) due to a fluctuation in power supply voltage, and the amplitude of the magnetic field applied to the fluid to be measured shifts, the amplitude of the interelectrode electromotive force changes, resulting in a flow rate measurement error due to the influence of shift. Such in-phase component noise cannot be removed even by the high-frequency exciting method.

To the contrary, the rectangular wave exciting method that uses a rectangular wave as an exciting current to be supplied to an exciting coil is resistant to in-phase component noise. In the rectangular wave exciting method, however, the interelectrode electromotive force is detected when a change in magnetic field becomes zero. When the exciting current has a high frequency, the detector must have high performance. Additionally, in the rectangular wave exciting method, when the exciting current has a high frequency, effects of the impedance of the exciting coil, the exciting current response, the magnetic field response, and an over-current loss in the core of the exciting coil or measuring pipe cannot be neglected. It is difficult to maintain rectangular wave excitation. As a result, in the rectangular wave exciting method, high-frequency excitation is difficult, and an increase in response to a change in flow rate or removal of 1/f noise cannot be realized.

DISCLOSURE OF INVENTION

The present invention has been made to solve the above-described problems, and has as its object to provide an electromagnetic flowmeter which can remove in-phase component noise and correct any flow rate measurement error and also realize high-frequency excitation.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, an asymmetrical exciting unit which applies asymmetrical magnetic fields to the fluid on both sides of a plane serving as a boundary in the measuring pipe, the plane including the electrode, being perpendicular to an axial direction of the measuring pipe, and being defined as the boundary in the measuring pipe, a signal conversion unit which obtains, from an electromotive force detected by the electrode, an asymmetrical exciting characteristic parameter which depends on a flow rate of the fluid and does not depend on a flow rate measurement error, and a flow rate output unit which calculates the flow rate of the fluid for which the flow rate measurement error has been corrected on the basis of the asymmetrical exciting characteristic parameter. As the basic technical idea of the present invention, asymmetrical magnetic fields are applied to the fluid on both sides of the boundary in the measuring pipe, i.e., the electrode axis which connects the electrodes to generate a phase difference between the input (exciting current) and the output (electromotive force). A flow rate measurement error due to the shift of the magnetic field state is corrected on the basis of the mechanism of the phase difference. More specifically, when asymmetrical magnetic fields (magnetic fields which periodically change) are applied to the fluid on both sides of the plane serving as the boundary in the measuring pipe, an electromotive force caused not by the flow velocity but by the change in magnetic field (magnetic flux) is generated in the electrode in addition to the electromotive force caused by the movement of the fluid, i.e., the flow velocity. The phase difference between the electromotive forces has a predetermined relationship. Hence, when the phase difference between the phase of the exciting current and the electromotive force generated in the electrode is taken into consideration, in-phase component can be removed. Hence, the rectangular wave exciting method need not be used, and the sine wave exciting method can be used.

In an arrangement of the electromagnetic flowmeter according to the present invention, the asymmetrical exciting unit comprises an exciting coil which is arranged at a position separated from the plane by an offset distance, and a power supply unit which supplies an exciting current to the exciting coil. When the exciting coil is arranged at the position separated from the plane by the offset distance, asymmetrical magnetic fields can be applied to the fluid to be measured on both sides of the plane serving as the boundary in the measuring pipe.

In an arrangement of the electromagnetic flowmeter according to the present invention, the signal conversion unit obtains, as the asymmetrical exciting characteristic parameter, a phase difference between an exciting current supplied to an exciting coil of the asymmetrical exciting unit and the electromotive force detected by the electrode, and the flow rate output unit calculates the flow rate of the fluid on the basis of the phase difference obtained by the signal conversion unit. When asymmetrical magnetic fields are applied to the fluid to be measured on both sides of the plane serving as the boundary in the measuring pipe by using at least one exciting coil, the phase difference between the exciting current and the electromotive force detected by the electrode is constant unless the flow rate of the fluid to be measured changes. In other words, when the flow rate of the fluid changes, the phase difference between the exciting current and the electromotive force changes. For this reason, the flow rate of the fluid to be measured can be calculated from the phase difference between the exciting current and the electromotive force.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, an exciting coil which is arranged at a position separated from a plane by an offset distance and applies asymmetrical magnetic fields to the fluid on both sides of the plane serving as a boundary in the measuring pipe, the plane including the electrode, being perpendicular to an axial direction of the measuring pipe, and being defined as the boundary in the measuring pipe, a power supply unit which supplies an exciting current to the exciting coil, a signal conversion unit which obtains a phase difference between the exciting current and an electromotive force detected by the electrode, and a flow rate output unit which calculates a flow rate of the fluid on the basis of the phase difference obtained by the signal conversion unit.

In an arrangement of the electromagnetic flowmeter according to the present invention, the asymmetrical exciting unit comprises a first exciting coil which is arranged at a position separated from the plane by an offset distance, a second exciting coil which is arranged at a position different from that of the first exciting coil, and a power supply unit which supplies exciting currents having the same phase to the first exciting coil and the second exciting coil, and in a magnetic field generated from the first exciting coil and a magnetic field generated from the second exciting coil, magnetic field components which are perpendicular to both of an axial direction of the electrode and the axial direction of the measuring pipe have the same phase and different amplitudes on the axis of the electrode. When the first exciting coil is arranged at the position separated from the plane by the offset distance, and the second exciting coil is arranged at the position different from that of the first exciting coil, asymmetrical magnetic fields can be applied to the fluid to be measured on both sides of the plane serving as the boundary in the measuring pipe. To generate the asymmetrical magnetic fields, a method of arranging the first exciting coil and second exciting coil asymmetrically with respect to the plane or a method of supplying exciting currents having different amplitudes to the first exciting coil and second exciting coil can be used.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, a first exciting coil which is arranged at a position separated from a plane by an offset distance, the plane including the electrode, being perpendicular to an axial direction of the measuring pipe, and being defined as the boundary in the measuring pipe, a second exciting coil which is arranged at a position different from that of the first exciting coil, a power supply unit which supplies exciting currents having the same phase to the first exciting coil and the second exciting coil, a signal conversion unit which obtains a phase difference between the exciting current and an electromotive force detected by the electrode, and a flow rate output unit which calculates a flow rate of the fluid on the basis of the phase difference obtained by the signal conversion unit, wherein in a magnetic field generated from the first exciting coil and a magnetic field generated from the second exciting coil, magnetic field components which are perpendicular to both of an axial direction of the electrode and the axial direction of the measuring pipe have the same phase and different amplitudes on the axis of the electrode. When asymmetrical magnetic fields are applied to the fluid to be measured on both sides of the plane serving as the boundary in the measuring pipe by using two exciting coils, and exciting currents having the same phase are supplied to the first exciting coil and second exciting coil, the phase difference between the exciting current and the electromotive force detected by the electrode is constant unless the flow rate of the fluid to be measured changes. In other words, when the flow rate of the fluid changes, the phase difference between the exciting current and the electromotive force changes. For this reason, the flow rate of the fluid to be measured can be calculated from the phase difference between the exciting current and the electromotive force.

In an arrangement of the electromagnetic flowmeter according to the present invention, on the basis of the phase difference $\phi$ obtained by the signal conversion unit, the flow rate output unit calculates the flow rate of the fluid by $\alpha 1 \times \tan(\pi/2 - \phi)$ ($\alpha 1$ is a coefficient). In this case, $\alpha 1$ is a predetermined coefficient.

In an arrangement of the electromagnetic flowmeter according to the present invention, the asymmetrical exciting unit comprises a first exciting coil which is arranged at a position separated from the plane by an offset distance, a second exciting coil which is arranged at a position different from that of the first exciting coil, and a power supply unit which supplies exciting currents to the first exciting coil and the second exciting coil while changing a phase difference between the exciting current supplied to the first exciting coil and the exciting current supplied to the second exciting coil, and in a magnetic field generated from the first exciting coil and a magnetic field generated from the second exciting coil, magnetic field components which are perpendicular to both of an axial direction of the electrode and the axial direction of the measuring pipe have the same amplitude on the axis of the electrode, and the phase difference between the magnetic field component of the first exciting coil and the magnetic field component of the second exciting coil changes. That the phase difference between the magnetic fields of two exciting coils changes means more specifically that the phase difference takes at least two different states, i.e., the phase difference takes at least two values. The phase difference between the magnetic field components can be obtained from the phase difference between the exciting currents supplied to the first and second exciting coils.

In an arrangement of the electromagnetic flowmeter according to the present invention, the signal conversion unit obtains an amplitude of the electromotive force detected by the electrode for each of at least two states with different phase differences between the exciting currents supplied to the two exciting coils of the asymmetrical exciting unit and obtains a ratio of the amplitudes as the asymmetrical exciting characteristic parameter, and the flow rate output unit calculates the flow rate of the fluid on the basis of the ratio of the amplitudes obtained by the signal conversion unit. When asymmetrical magnetic fields are applied to the fluid to be measured on both sides of the plane serving as the boundary in the measuring pipe by using two exciting coils, and the magnetic field component generated from the first exciting coil and that generated from the second exciting coil have the same amplitude, the amplitude ratio of the electromotive force detected by the electrode does not change even when the amplitude of the magnetic field changes. For this reason, the flow rate of the fluid to be measured can be calculated from the amplitude ratio of the electromotive force.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, a first exciting coil which is arranged at a position separated from a plane by an offset distance, the plane including the electrode being perpendicular to an axial direction of the measuring pipe, and being defined as the boundary in the measuring pipe, a second exciting coil which is arranged at a position different from that of the first exciting coil, a power supply unit which supplies exciting currents to the first exciting coil and the second exciting coil while changing a phase difference between the exciting current supplied to the first exciting coil and the exciting current supplied to the second exciting coil, a signal conversion unit which obtains an amplitude of the electromotive force detected by the electrode for each of at least two states with different phase differences and obtains a ratio of the amplitudes, and a flow rate output unit which calculates a flow rate of the fluid on the basis of the ratio of the amplitudes obtained by the signal conversion unit, wherein in a magnetic field generated from the first exciting coil and a magnetic field generated from the second exciting coil, magnetic field components which are perpendicular to both of an axial direction of the electrode and the axial direction of the measuring pipe have the same amplitude on the axis of the electrode, and the phase difference between the magnetic field component of the first exciting coil and the magnetic field component of the second exciting coil takes at least two values.

In an arrangement of the electromagnetic flowmeter according to the present invention, when the phase difference between the exciting current supplied to the first exciting coil and the exciting current supplied to the second exciting coil takes two values $2\chi$ and $2\psi$ ($\chi$ and $\psi$ are different real numbers), the flow rate output unit calculates, on the basis of a ratio R of the amplitudes obtained by the signal conversion unit, the flow rate of the fluid by $\alpha 2 \times \{(R \sin \psi - \sin \chi)/(R \cos \psi - \cos \chi)\}$ ($\alpha 2$ is a coefficient). In this case, $\alpha 2$ is a predetermined coefficient.

In an arrangement of the electromagnetic flowmeter according to the present invention, the asymmetrical exciting unit comprises a first exciting coil which is arranged at a position separated from the plane by an offset distance, a second exciting coil which is arranged at a position different from that of the first exciting coil, and a power supply unit which supplies exciting currents to the first exciting coil and the second exciting coil while continuously switching a phase difference between the exciting current supplied to the first exciting coil and the exciting current supplied to the second exciting coil, and in a magnetic field generated from the first exciting coil and a magnetic field generated from the second exciting coil, magnetic field components which are perpendicular to both of an axial direction of the electrode and the axial direction of the measuring pipe have the same amplitude on the axis of the electrode, and the phase difference between the magnetic field component of the first exciting coil and the magnetic field component of the second exciting coil continuously switches.

In an arrangement of the electromagnetic flowmeter according to the present invention, the signal conversion unit obtains an amplitude of the electromotive force detected by the electrode for each of a plurality of states with different phase differences between the exciting currents supplied to the two exciting coils of the asymmetrical exciting unit and obtains, as the asymmetrical exciting characteristic parameter, the phase difference for which the amplitude has a predetermined value, and the flow rate output unit calculates the flow rate of the fluid on the basis of the phase difference obtained by the signal conversion unit. When asymmetrical magnetic fields are applied to the fluid to be measured on both sides of the plane serving as the boundary in the measuring pipe by using two exciting coils, and the magnetic field component generated from the first exciting coil and that generated from the second exciting coil have the same amplitude, the phase difference between the exciting currents for which the amplitude of the electromotive force detected by the electrode has a predetermined value does not depend on the amplitude of the magnetic field. For this reason, the flow rate of the fluid to be measured can be calculated from the phase difference between the exciting currents for which the amplitude of the electromotive force has a predetermined value.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, a first exciting coil which is arranged at a position separated from a plane by an offset distance, the plane including the electrode, being perpendicular to an axial direction of the measuring pipe, and being defined as the boundary in the measuring pipe, a second exciting coil which is arranged at a position different from that of the first exciting coil, a power supply unit which supplies exciting currents to the first exciting coil and the second exciting coil while continuously switching a phase difference between the exciting current supplied to the first exciting coil and the exciting current supplied to the second exciting coil, a signal conversion unit which obtains an amplitude of the electromotive force detected by the electrode for each of a plurality of states with different phase differences and obtains the phase difference for which the amplitude has a predetermined value, and a flow rate output unit which calculates a flow rate of the fluid on the basis of the phase difference obtained by the signal conversion unit, wherein in a magnetic field generated from the first exciting coil and a magnetic field generated from the second exciting coil, magnetic field components which are perpendicular to both of an axial direction of the electrode and the axial direction of the measuring pipe have the same amplitude on the axis of the electrode, and the phase difference between the magnetic field component of the first exciting coil and the magnetic field component of the second exciting coil continuously switches.

In an arrangement of the electromagnetic flowmeter according to the present invention, on the basis of the phase difference $\theta 2$ obtained by the signal conversion unit, the flow rate output unit calculates the flow rate of the fluid by $\alpha 3 \times \tan(\theta 2/2)$ ($\alpha 3$ is a coefficient). In this case, $\alpha 3$ is a predetermined coefficient.

In an arrangement of the electromagnetic flowmeter according to the present invention, the asymmetrical exciting unit comprises a first exciting coil which is arranged at a position separated from the plane by an offset distance, a second exciting coil which is arranged at a position different from that of the first exciting coil, and a power supply unit which supplies exciting currents having the same frequency and a predetermined phase difference to the first exciting coil and the second exciting coil while changing the frequency, and in a magnetic field generated from the first exciting coil and a magnetic field generated from the second exciting coil, magnetic field components which are perpendicular to both of an axial direction of the electrode and the axial direction of the measuring pipe have the same amplitude, same frequency, and the predetermined phase difference on the axis of the electrode, and the frequency of the magnetic field component switches between at least two values.

In an arrangement of the electromagnetic flowmeter according to the present invention, the signal conversion unit obtains an amplitude of the electromotive force detected by the electrode for each of at least two states in which the frequency of the exciting currents supplied to the two exciting coils of the asymmetrical exciting unit switches and obtains a ratio of the amplitudes as the asymmetrical exciting characteristic parameter and the flow rate output unit calculates the flow rate of the fluid on the basis of the ratio of the amplitudes obtained by the signal conversion unit.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, a first exciting coil which is arranged at a position separated from a plane by an offset distance, the plane including the electrode, being perpendicular to an axial direction of the measuring pipe, and being defined as the boundary in the measuring pipe, a second exciting coil which is arranged at a position different from that of the first exciting coil, a power supply unit which supplies exciting currents having the same frequency and a predetermined phase difference to the firs t exciting coil and the second exciting coil while changing the frequency a signal conversion unit which obtains an amplitude of the electromotive force detected by the electrode for each of at least two states with different frequencies and obtains a ratio of the amplitudes, and a flow rate output unit which calculates a flow rate of the fluid on the basis of the ratio of the amplitudes obtained by the signal conversion unit, wherein in a magnetic field generated from the first exciting coil and a magnetic field generated from the second exciting coil, magnetic field components which are perpendicular to both of an axial direction of the electrode and the axial direction of the measuring pipe have the same amplitude, same frequency, and the predetermined phase difference on the axis of the electrode, and the frequency of the magnetic field component switches between at least two values, i.e., takes at least two different frequencies.

In an arrangement of the electromagnetic flowmeter according to the present invention, when the frequency of the exciting currents supplied to the first and second exciting coils switches between two values $\omega 1$ and $\omega 2$, the flow rate output unit calculates, on the basis of a ratio Ror of the amplitudes obtained by the signal conversion unit, the flow rate of the fluid by $\alpha 4 \times \{(Ror\omega 2-\omega 1)\sin(\theta 2/2)\}/\{(1-Ror)\cos(\theta 2/2)\}$ ($\alpha 4$ is a coefficient). In this case, $\alpha 4$ is a predetermined coefficient.

In an arrangement of the electromagnetic flowmeter according to the present invention, when the frequency of the exciting currents supplied to the first and second exciting coils switches between two values $\omega 1$ and $\omega 2$, the flow rate output unit calculates, on the basis of a ratio Rvx of real axis components of the amplitudes obtained by the signal conversion unit, the flow rate of the fluid by $\alpha 4 \times \{(Rvx\omega 2-\omega 1)\sin(\theta 2)\}/[(1-Rvx)(1+\cos(\theta 2))]$ ($\alpha 4$ is a coefficient).

In an arrangement of the electromagnetic flowmeter according to the present invention, when the frequency of the exciting currents supplied to the first and second exciting coils switches between two values $\omega 1$ and $\omega 2$, the flow rate output unit calculates, on the basis of a ratio Rvy of imaginary axis components of the amplitudes obtained by the signal conversion unit, the flow rate of the fluid by $\alpha 4 \times [(Rvy\omega 2-\omega 1)\{1-\cos(\theta 2)\}]/\{(1-Rvy)\sin(\theta 2)\}$ ($\alpha 4$ is a coefficient).

In an arrangement of the electromagnetic flowmeter according to the present invention, the asymmetrical exciting unit comprises a first exciting coil which is arranged at a position separated from the plane by an offset distance, a second exciting coil which is arranged at a position different from that of the first exciting coil, and a power supply unit which supplies exciting currents having the same frequency and a predetermined phase difference to the first exciting coil and the second exciting coil while continuously switching the frequency, and in a magnetic field generated from the first exciting coil and a magnetic field generated from the second exciting coil, magnetic field components which are perpendicular to both of an axial direction of the electrode and the axial direction of the measuring pipe have the same amplitude, same frequency, and the predetermined phase difference on the axis of the electrode, and the frequency of the magnetic field component continuously switches.

In an arrangement of the electromagnetic flowmeter according to the present invention, the signal conversion unit obtains an amplitude of the electromotive force detected by the electrode for each of a plurality of states in which the frequency of the exciting currents supplied to the two exciting coils of the asymmetrical exciting unit switches and obtains, as the asymmetrical exciting characteristic parameter, the frequency of the exciting current for which the amplitude has a predetermined value, and the flow rate output unit calculates the flow rate of the fluid on the basis of the frequency obtained by the signal conversion unit.

An electromagnetic flowmeter according to the present invention comprises a measuring pipe through which a fluid to be measured flows, an electrode which is arranged in the measuring pipe and detects an electromotive force generated by a magnetic field applied to the fluid and flow of the fluid, a first exciting coil which is arranged at a position separated from a plane by an offset distance, the plane including the electrode, being perpendicular to an axial direction of the measuring pipe, and being defined as the boundary in the measuring pipe, a second exciting coil which is arranged at a position different from that of the first exciting coil, a power supply unit which supplies exciting currents having the same frequency and a predetermined phase difference to the first exciting coil and the second exciting coil while continuously switching the frequency, a signal conversion unit which obtains an amplitude of the electromotive force detected by the electrode for each of a plurality of states with different frequencies and obtains the frequency for which the amplitude has a predetermined value, and a flow rate output unit which calculates a flow rate of the fluid on the basis of the frequency obtained by the signal conversion unit, wherein in a magnetic field generated from the first exciting coil and a magnetic field generated from the second exciting coil, magnetic field components which are perpendicular to both of an axial direction of the electrode and the axial direction of the measuring pipe have the same amplitude, same frequency, and the predetermined phase difference on the axis of the electrode and the frequency of the magnetic field component continuously switches.

In an arrangement of the electromagnetic flowmeter according to the present invention, on the basis of the phase difference $\theta 2$ between the exciting current supplied to the first exciting coil and the exciting current supplied to the second exciting coil and the frequency $\omega 0$ obtained by the signal conversion unit, the flow rate output unit calculates the flow rate of the fluid by $\alpha 5 \times \omega 0 \tan(\theta 2/2)$ ($\alpha 5$ is a coefficient).

An arrangement of the electromagnetic flowmeter according to the present invention uses a sine wave exciting method.

In an arrangement of the electromagnetic flowmeter according to the present invention, the number of the electrodes is one.

DETAILED DESCRIPTION OF PREFERRED EMBODIMENTS

Basic Principle

Before a description of the basic principle of the present invention, generally known basic mathematical knowledge will be described. A cosine wave A cos(ωt) and sine wave B sin(ωt), which have the same frequency and different amplitudes, are synthesized into the following cosine wave. A and B are amplitudes, and ω is an angular frequency.

$$A\cos(\omega t)+B\sin(\omega t)=(A^2+B^2)^{1/2}\cos(\omega t-\epsilon) \text{ for } \epsilon=\tan^{-1}(B/A) \quad (1)$$

To analyze the synthesis of equation (1), it is convenient to map the cosine wave A cos(ωt) and sine wave B sin (ωt) onto a complex coordinate plane while plotting the amplitude A of the cosine wave A cos(ωt) along the real axis and the amplitude B of the sine wave B sin(ωt) along the imaginary axis. More specifically, on the complex coordinate plane, a distance $(A^2+B^2)^{1/2}$ from the origin gives the amplitude of the synthetic wave, and an angle $\epsilon=\tan^{-1}(B/A)$ with respect to the real axis gives the phase difference between the synthetic wave and ωt.

In addition, on the complex coordinate plane, the following relation holds $$C\exp(j\epsilon)=C\cos(\epsilon)+jC\sin(\epsilon) \quad (2)$$

Equation (2) is an expression of a complex vector. In equation (2), j is the imaginary number unit, C is the length of the complex vector, and ε is the direction of the complex vector. Hence, to analyze the geometrical relationship on the complex coordinate plane, it is convenient to use conversion to a complex vector.

In the following description, to explain a behavior that is exhibited by an interelectrode electromotive force and the manner the present invention uses the behavior, mapping to the complex coordinate plane and geometrical analysis using a complex vector are employed.

Figure 1:
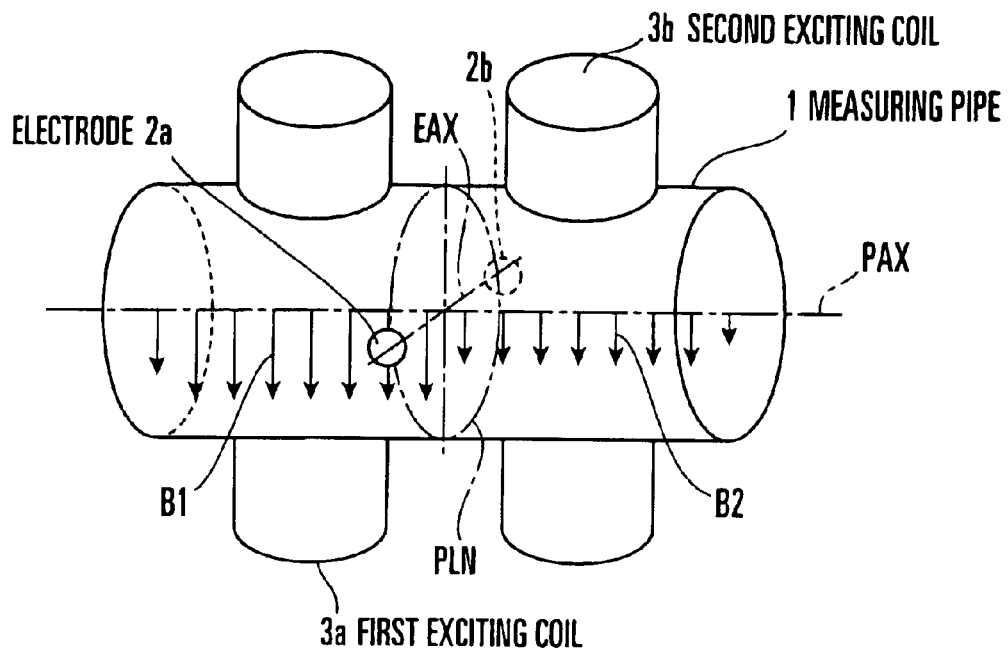
FIG. 1 is a block diagram for explaining the basic principle of an electromagnetic flowmeter according to the present invention.

First, an interelectrode electromotive force which is irrelevant to the flow rate (flow velocity) of a fluid to be measured per unit time will be described. FIG. 1 is a block diagram for explaining the basic principle of an electromagnetic flowmeter according to the present invention. This electromagnetic flowmeter comprises a measuring pipe 1, a pair of electrodes 2a and 2b, and a first exciting coil 3a and second exciting coil 3b. A fluid to be measured flows through the measuring pipe 1. The pair of electrodes 2a and 2b oppose each other in the measuring pipe 1 to be perpendicular to both the magnetic field applied to the fluid to be measured and an axis PAX of the measuring pipe 1 and also come into contact with the fluid to be measured. The electrodes 2a and 2b detect an electromotive force generated by the magnetic field and the flow of the fluid to be measured. A plane PLN which includes the electrodes 2a and 2b and is perpendicular to the direction of the measuring pipe axis PAX is defined as a boundary in the measuring pipe 1. In this case, the first exciting coil 3a and second exciting coil 3b apply asymmetrical magnetic fields to the fluid to be measured on both sides of the plane PLN, i.e., the boundary in the measuring pipe 1. In this example, the first exciting coil 3a and second exciting coil 3b are arranged on opposite sides of the plane PLN.

Of the magnetic field generated from the first exciting coil 3a, a magnetic field component (magnetic flux density) B1 which is perpendicular to both an electrode axis EAX that connects the electrodes 2a and 2b and the measuring pipe axis PAX on the electrode axis EAX, and of the magnetic field generated from the second exciting coil 3b, a magnetic field component (magnetic flux density) B2 which is perpendicular to both the electrode axis EAX and the measuring pipe axis PAX on the electrode axis EAX are given by $$B1=b1\cos(\omega 0 t-\theta 1) \quad (3)$$

$$B2=b2\cos(\omega 0 t-\theta 2) \quad (4)$$

In equations (3) and (4), b1 and b2 are the amplitudes, ω0 is the angular frequency, and θ1 and θ2 are the phase differences (phase delays) from ω0t. The magnetic flux density B1 will be referred to as the magnetic field B1, and the magnetic flux density B2 will be referred to as the magnetic field B2.

An electromotive force caused by a change in magnetic field is obtained by a time differential dB/dt of the magnetic field. The magnetic fields B1 and B2 generated from the first exciting coil 3a and second exciting coil 3b are differentiated as follows $$dB1/dt=-b1\omega 0\sin(\omega 0 t-\theta 1) \quad (5)$$

$$dB2/dt=-b2\omega 0\sin(\omega 0 t-\theta 2) \quad (6)$$

Figure 2:
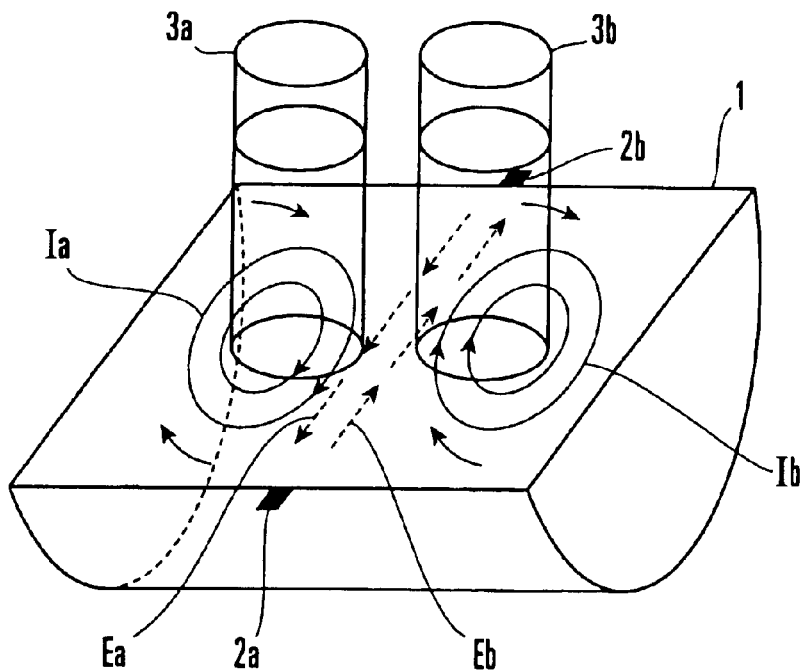
FIG. 2 is a view showing an eddy current and interelectrode electromotive force when the flow rate of a fluid to be measured is 0.

When the flow rate of the fluid to be measured is 0, eddy currents generated by the magnetic fields B1 and B2 contain only components generated by a change in magnetic fields. An eddy current Ia by the magnetic field B1 and eddy current Ib by the magnetic field B2 have directions as shown in FIG. 2. Hence, in the plane that includes the electrode axis EAX and measuring pipe axis PAX, an interelectrode electromotive force Ea that is generated by a change in magnetic field B1 and is irrelevant to the flow rate (flow velocity) and an interelectrode electromotive force Eb that is generated by a change in magnetic field B2 and is irrelevant to the flow rate (flow velocity) have opposite directions, as shown in FIG. 2.

At this time, a total interelectrode electromotive force E obtained by adding the interelectrode electromotive forces Ea and Be corresponds to a value obtained by calculating the difference between the time differentials dB1/dt and dB2/dt of the magnetic fields and multiplying the difference by a coefficient k (a complex number related to the conductivity and dielectric constant of the fluid to be measured and the structure of the measuring pipe 1).

$$E=k\{-b2\omega 0\sin(\omega 0 t-\theta 2)+b1\omega 0\sin(\omega 0 t-\theta 1)\} \quad (7)$$

Equation (7) can be rewritten to $$\begin{aligned} E &= -kb2\omega 0\sin(\omega 0 t)\cos(-\theta 2) - kb2\omega 0\cos(\omega 0 t)\sin(-\theta 2) + \\ &\quad kb1\omega 0\sin(\omega 0 t)\cos(-\theta 1) + kb1\omega 0\cos(\omega 0 t)\sin(-\theta 1) \\ &= \{-b2\sin(-\theta 2) + b1\sin(-\theta 1)\}\omega 0 k\cos(\omega 0 t) + \\ &\quad \{-b2\cos(-\theta 2) + b1\cos(-\theta 1)\}\omega 0 k\sin(\omega 0 t) \end{aligned} \quad (8)$$

When equation (8) is mapped onto a complex coordinate plane based on ω0t, a real axis component Ex and imaginary axis component Ey are given by $$Ex=\{-b2\sin(-\theta 2)+b1\sin(-\theta 1)\}\omega 0 k \quad (9)$$

$$Ey=\{-b2\cos(-\theta 2)+b1\cos(-\theta 1)\}\omega 0 k \quad (10)$$

Ex and Ey in equations (9) and (10) are rewritten to $$\begin{aligned} Ex &= \{-b2\sin(-\theta 2) + b1\sin(-\theta 1)\}\omega 0 k \\ &= \{-b2\cos(\pi/2 + \theta 2) + b1\cos(\pi/2 + \theta 1)\}\omega 0 k \\ &= \{b2\cos(-\pi/2 + \theta 2) + b1\cos(\pi/2 + \theta 1)\}\omega 0 k \end{aligned} \quad (11)$$

$$Ey = \{-b2\cos(-\theta 2) + b1\cos(-\theta 1)\}\omega 0k \quad (12)$$
$$= \{-b2\sin(\pi/2 + \theta 2) + b1\sin(\pi/2 + \theta 1)\}\omega 0k$$
$$= \{b2\sin(-\pi/2 + \theta 2) + b1\sin(\pi/2 + \theta 1)\}\omega 0k$$

to obtain a complex vector Ec given by $$Ec = Ex + jEy \quad (13)$$
$$= \{b2\cos(-\pi/2 + \theta 2) + b1\cos(\pi/2 + \theta 1)\}\omega 0k + j\{b2\sin(-\pi/2 + \theta 2) + b1\sin(\pi/2 + \theta 1)\}\omega 0k$$
$$= \{b1\cos(\pi/2 + \theta 1) + jb1\sin(\pi/2 + \theta 1)\}\omega 0k + \{b2\cos(-\pi/2 + \theta 2) + jb2\sin(-\pi/2 + \theta 2)\}\omega 0k$$
$$= b1\omega 0k\exp\{j(\pi/2 + \theta 1)\} + b2\omega 0k\exp\{j(-\pi/2 + \theta 2)\}$$

The above-described coefficient k can be converted into a complex vector given by $$k = rk\cos(\theta 00) + jrk\sin(\theta 00) \quad (14)$$
$$= rk\exp(j\theta 00)$$

In equation (14), rk is a proportional coefficient, and θ00 is the angle of the vector k with respect to the real axis.

When equation (14) is substituted into equation (13), the interelectrode electromotive force Ec (an interelectrode electromotive force which is caused only by a time rate change in magnetic field and is irrelevant to the flow velocity) converted into the complex vector is given by $$Ec = b1\omega 0k\exp(j(\pi/2 + \theta 1)) + b2\omega 0k\exp(j(-\pi/2 + \theta 2)) \quad (15)$$
$$= b1\omega 0rk\exp(j(\pi/2 + \theta 1 + \theta 00)) + b2\omega 0rk\exp(j(-\pi/2 + \theta 2(+\theta 00)))$$

In equation (15), $b1\omega 0rk\exp\{j(\pi/2+\theta 1+\theta 00)\}$ is a complex vector whose length is $b1\omega 0rk$ and angle from the real axis is $\pi/2+\theta 1+\theta 00$, and $b2\omega 0rk\exp\{j(\pi/2+\theta 2+\theta 00)\}$ is a complex vector whose length is $b2\omega 0rk$ and angle from the real axis is $-\pi/2+\theta 2+\theta 00$.

Figure 3:
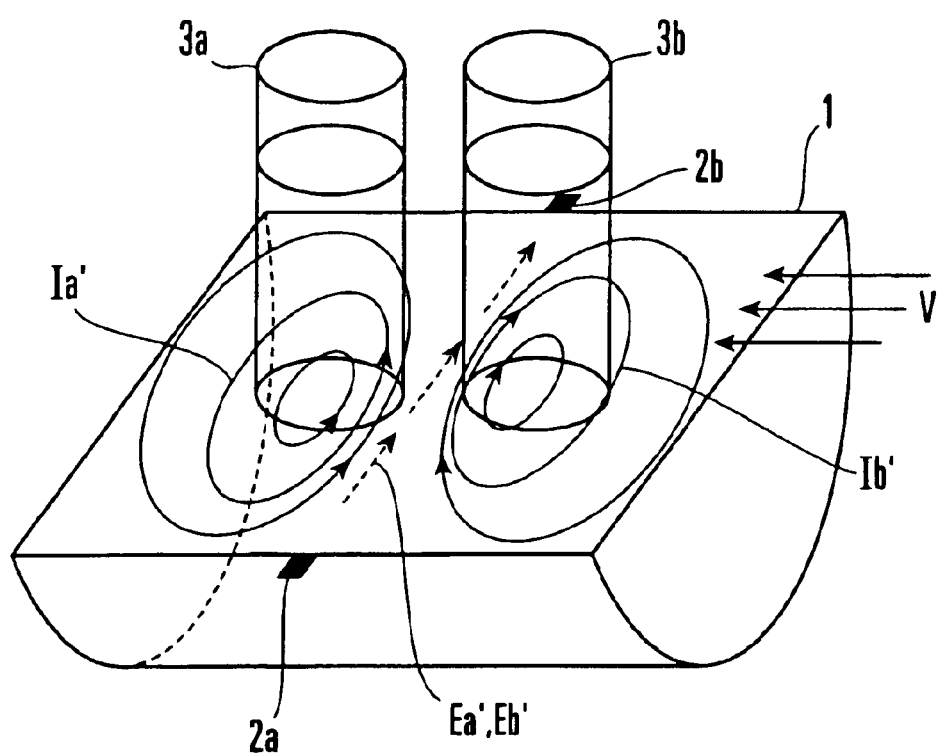
FIG. 3 is a view showing an eddy current and interelectrode electromotive force when the flow rate of a fluid to be measured is not 0.

The interelectrode electromotive force caused by the flow rate (flow velocity) of the fluid to be measured will be described next. When the flow velocity of the fluid to be measured is V (V≠0), eddy currents by the magnetic fields B1 and B2 respectively contain components V×B1 and V×B2 caused by the flow velocity in addition to the eddy current components Ia and Ib when the flow velocity is 0. For this reason, an eddy current Ia' by the magnetic field B1 and an eddy current Ib' by the magnetic field B2 have directions as shown in FIG. 3. Hence, an interelectrode electromotive force Ea' generated by the flow velocity V of the fluid to be measured and the magnetic field B1 and an interelectrode electromotive force Eb' generated by the flow velocity V and the magnetic field B2 have the same direction.

At this time, a total interelectrode electromotive force Ev obtain by adding the interelectrode electromotive forces Ea' and Eb' generated by the flow velocity corresponds to the sum of a value obtained by multiplying the magnetic field B1 by a coefficient kv (a complex number related to the flow velocity V, the conductivity and dielectric constant of the fluid to be measured, and the structure of the measuring pipe 1) and a value obtained by multiplying the magnetic field B2 by the coefficient kv.

$$Ev = kv\{b1\cos(\omega 0t-\theta 1) + b2\cos(\omega 0t-\theta 2)\} \quad (16)$$

When the term of sin and the term of cos of equation (16) are expanded, we obtain $$Ev = kvb1\cos(\omega 0t)\cos(-\theta 1) - kvb1\sin(\omega 0t)\sin(-\theta 1) + \quad (17)$$
$$kvb2\cos(\omega 0t)\cos(-\theta 2) - kvb2\sin(\omega 0t)\sin(-\theta 2)$$
$$= \{b1\cos(-\theta 1) + b2\cos(-\theta 2)\}kv\cos(\omega 0t) + \{-b1\sin(-\theta 1) - b2\sin(-\theta 2)\}kv\sin(\omega 0t)$$

When equation (17) is mapped onto the complex coordinate plane based on ω0t, a real axis component Evx and imaginary axis component Evy are given by $$Evx = \{b1\cos(-\theta 1) + b2\cos(-\theta 2)\}kv \quad (18)$$
$$Evy = \{-b1\sin(-\theta 1) - b2\sin(-\theta 2)\}kv \quad (19)$$

Equations (18) and (19) are transformed into a complex vector Evc.

$$Evx = \{b1\cos(-\theta 1) + b2\cos(-\theta 2)\}kv \quad (20)$$
$$= \{b1\cos(-\theta 1) + b2\cos(\theta 2)\}kv$$

$$Evy = \{-b1\sin(-\theta 1) - b2\sin(-\theta 2)\}kv \quad (21)$$
$$= \{b1\sin(\theta 1) + b2\sin(\theta 2)\}kv$$

$$Evc = Evx + jEvy \quad (22)$$
$$= \{b1\cos(\theta 1) + b2\cos(\theta 2)\}kv + j\{b1\sin(\theta 1) + b2\sin(\theta 2)\}kv$$
$$= \{b1\cos(\theta 1) + jb1\sin(\theta 1)\}kv + \{b2\cos(\theta 2) + jb2\sin(\theta 2)\}kv$$
$$= b1kv\exp(j\theta 1) + b2kv\exp(j\theta 2)$$

The above-described coefficient kv is transformed to a complex vector $$kv = rkv\cos(\theta 01) + jrkv\sin(\theta 01)\} \quad (23)$$
$$= rkv\exp(j\theta 01)$$

In equation (23), rkv is a proportional coefficient, θ01 is the angle of the vector kv with respect to the real axis. In this case, rkv corresponds to a value obtained by multiplying the proportional coefficient rk (equation (14)) by the flow velocity V and a proportional coefficient γ. That is, $$rkv = rkV\gamma \quad (24)$$

When equation (23) is substituted into equation (22), the Interelectrode electromotive force Evc converted into complex coordinates is obtained as $$Evc = b1kv\exp(j\theta 1) + b2kv\exp(j\theta 2) \quad (25)$$
$$= b1rkv\exp\{(j(\theta 1 + \theta 01))\} + b2rkv\exp\{(j(\theta 2 + \theta 01))\}$$

In equation (25), $b1rkv\exp\{j(\theta 1+\theta 01)\}$ is a complex vector whose length is b1rkv and angle from the real axis is $\theta 1+\theta 01$, and $b2rkv\exp\{j(\theta 2+\theta 01)\}$ is a complex vector whose length is b2rkv and angle from the real axis is $\theta 2+\theta 01$.

From equations (15) and (25), a total interelectrode electromotive force Eac obtained by adding the interelectrode electromotive force Ec generated by a time-rate change in magnetic field and the interelectrode electromotive force Evc generated by the flow velocity of the fluid is given by $$Eac = Ec + Evc \quad (26)$$
$$= b1\omega 0rk\exp\{j(\pi/2 + \theta 1 + \theta 00)\} +$$
$$b2\omega 0rk\exp\{j(-\pi/2 + \theta 2 + \theta 00)\} +$$
$$b1rkv\exp\{j(\theta 1 + \theta 01)\} + b2rkv\exp\{j(\theta 2 + \theta 01)\}$$

As is apparent from equation (26), the interelectrode electromotive force Eac is described by the four complex vectors $b1\omega 0rk\exp\{j(\pi/2+\theta 1+\theta 00)\}$, $b2\omega 0rk\exp\{j(-\pi/2+\theta 2+\theta 00)\}$, $b1rkv\exp\{j(\theta 1+\theta 01)\}$, and $b2rkv\exp\{j(\theta 2+\theta 01)\}$. The length of a synthetic vector obtained by synthesizing the four complex vectors represents the amplitude of the output (interelectrode electromotive force Eac), and an angle $\phi$ of the synthetic vector represents the phase difference (phase delay) of the interelectrode electromotive force Eac from the phase $\omega 0t$ of the input (exciting current).

The present invention will be described below assuming $\theta 1=\theta 00=\theta 01=0$ for easy understanding. Accordingly, equation (26) can be rewritten to $$Eac = b1\omega 0rk\exp\{j(\pi/2)\} + b2\omega 0rk\exp\{j(-\pi/2 + \theta 2)\} + \quad (27)$$
$$b1rkv\exp\{j(0)\} + b2rkv\exp\{j(\theta 2)\}$$
$$= jb1\omega 0rk + b2\omega 0rk\exp\{j(-\pi/2 + \theta 2)\} +$$
$$b1rkv + b2rkv\exp(j\theta 2)$$

Figure 4:
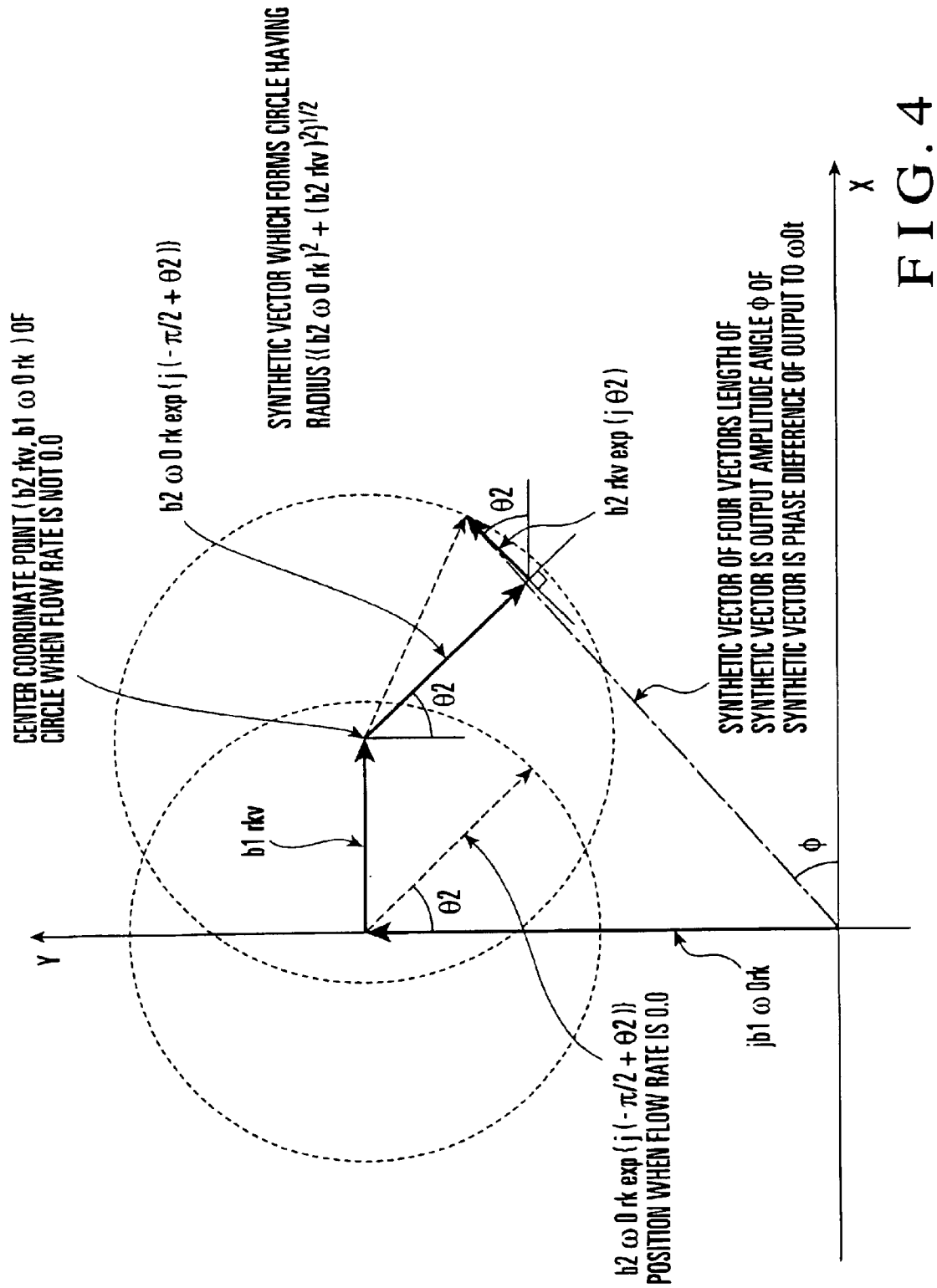
FIG. 4 is a graph showing the geometrical relationship between four complex vectors representing the interelectrode electromotive force in the electromagnetic flowmeter shown in FIG. 1.

At this time, the four vectors representing the interelectrode electromotive force Eac has a geometrical relationship shown in FIG. 4. As described above, $\theta 1=0$. For this reason, the magnetic field B1 generated from the first exciting coil 3a is $B1=b1 \cos(\omega 0t)$, and the magnetic field B2 generated from the second exciting coil 3b is $B2=b2 \cos(\omega 0t-\theta 2)$. The phase difference between the magnetic field B1 and the magnetic field B2 is $\theta 2$. When the phase difference $\theta 2$ between the magnetic fields B1 and B2 is changed, the interelectrode electromotive force Eac traces the orbit on the circumference of a circle which has a radius $\{(b2\omega 0rk)^2+(b2rkv)^2\}^{1/2}$ and a center at coordinate points $(b1rkv, b1\omega 0rk)$ on the complex plane, shown in FIG. 4.

Figure 25:
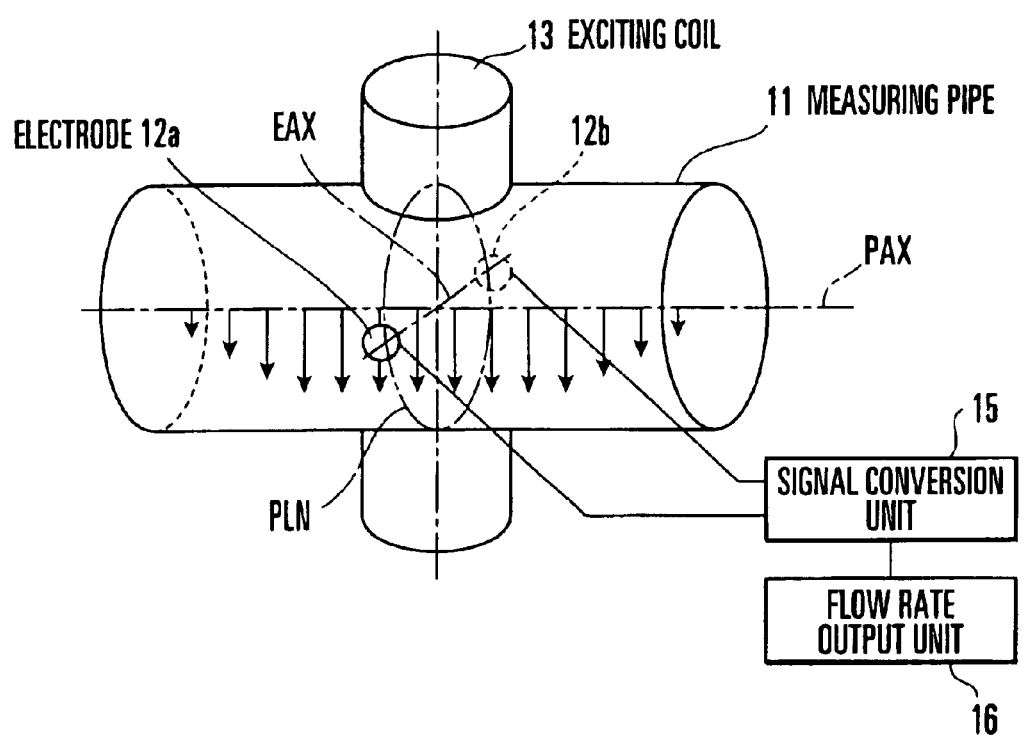
FIG. 25 is a block diagram showing the arrangement of a conventional electromagnetic flowmeter.

In the above-described basic principle, the conventional electromagnetic flowmeter described with reference to FIG. 25 corresponds to a structure in which $b1=b2$ and $\theta 2=0$. This electromagnetic flowmeter detects the flow rate on the basis of the magnitude of the interelectrode electromotive force (the length of the synthetic vector).

When $b1=b2=0.5\beta$ ($\beta$ is a predetermined physical quantity), and $\theta 2=0$ in equation (27), the interelectrode electromotive force Eac is given by $$Eac = jb1\omega 0rk + b2\omega 0rk\exp\{j(-\pi/2 + \theta 2)\} + \quad (28)$$
$$b1rkv + b2rkv\exp(j\theta 2)$$
$$= j0.5\beta\omega 0rk - j0.5\beta\omega 0rk + 0.5\beta rkv + 0.5\beta rkv$$
$$= \beta rkv$$

Figure 5A:
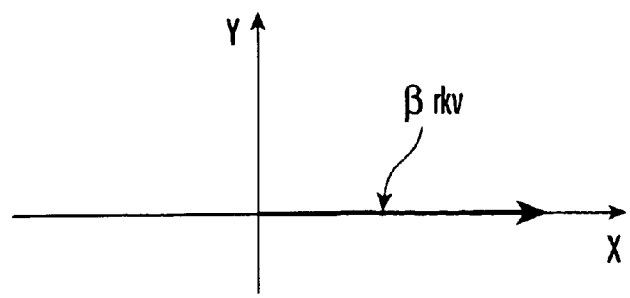
FIGS. 5A and 5B are explanatory views for explaining problems in a conventional electromagnetic flowmeter.
Figure 5B:
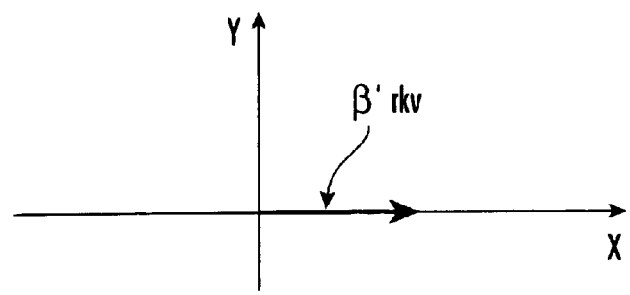

When the amplitude of the exciting current to the exciting coil 13 shifts due to a fluctuation in power supply voltage of the power supply unit, $\beta$ corresponding to the amplitude of the magnetic field shifts to $\beta'$ in equation (28). In this case, as shown in FIGS. 5A and 5B, even when the flow rate of the fluid to be measured does not change, the length of the synthetic vector (the amplitude of the interelectrode electromotive force Eac) changes. Hence, a flow rate measurement error due to the influence of shift of the amplitude of the magnetic field occurs.

First Embodiment

Figure 6:
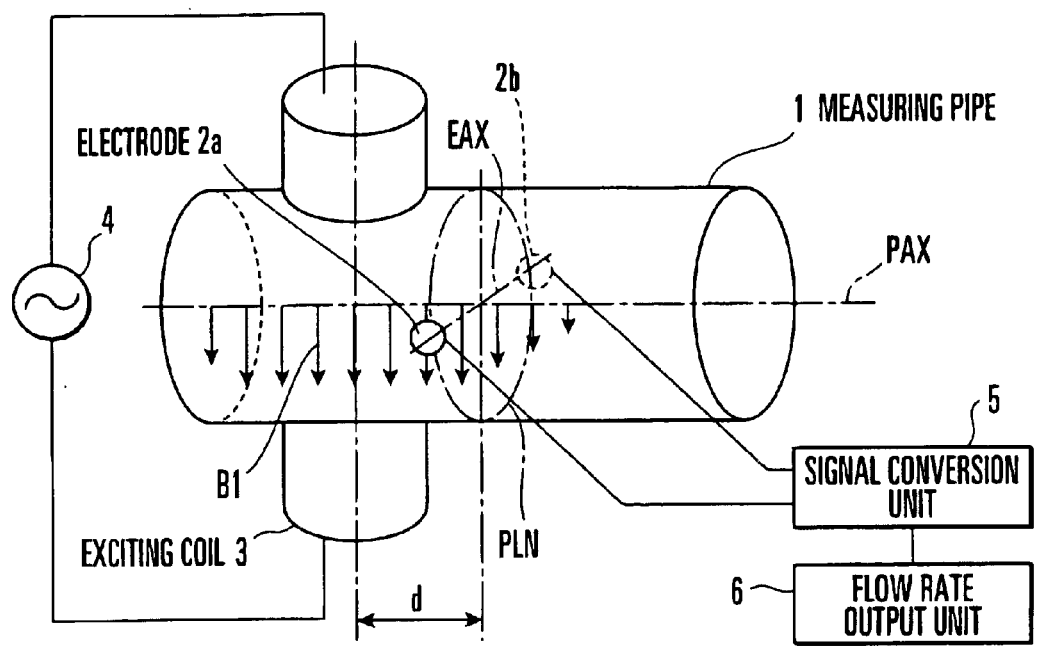
FIG. 6 is a block diagram showing the arrangement of an electromagnetic flowmeter according to the first embodiment of the present invention.

An embodiment of the present invention will be described below in detail. FIG. 6 is a block diagram showing the arrangement of an electromagnetic flowmeter according to the first embodiment of the present invention. The same reference numerals as in FIG. 1 denote the same components in FIG. 6. The electromagnetic flowmeter according to this embodiment has a measuring pipe 1, a pair of electrodes 2a and 2b, an exciting coil 3, a power supply unit 4, a signal conversion unit 5, and a flow rate output unit 6A fluid to be measured flows through the measuring pipe 1. The pair of electrodes 2a and 2b oppose each other in the measuring pipe 1 to be perpendicular to both an axis PAX and the magnetic field applied to the fluid to be measured and also come into contact with the fluid to be measured. The electrodes 2a and 2b detect an electromotive force generated by the magnetic field and the flow of the fluid to be measured. A plane PLN which includes the electrodes 2a and 2b and is perpendicular to the direction of the measuring pipe axis PAX is defined as a boundary in the measuring pipe 1. In this case, the exciting coil 3 applies asymmetrical magnetic fields to the fluid to be measured on both sides of the plane PLN, i.e., the boundary in the measuring pipe 1. The power supply unit 4 supplies an exciting current to the exciting coil 3 to generate a magnetic field. The signal conversion unit 5 obtains the phase difference between the exciting current and an interelectrode electromotive force detected by the electrodes 2a and 2b. The flow rate output unit 6 calculates the flow rate of the fluid to be measured on the basis of the phase difference obtained by the signal conversion unit 5.

In this embodiment, only one exciting coil 3 is used. This corresponds to a structure in which $b2=\theta 2=0$ in equation (27) described above. The exciting coil 3 is arranged at a position separated from the plane PLN by an offset distance d (d>0). Since $\theta 1=0$ in equation (3) of the magnetic field generated from the exciting coil 3 when the exciting current is supplied from the power supply unit 4, a magnetic field component B1 which is perpendicular, on an electrode axis EAX that connects the electrodes 2a and 2b, to both the electrode axis EAX and the measuring pipe axis PAX is given by $$B1=b1 \cos(\omega 0t) \quad (29)$$

When $b2=\theta 2=0$ in equation (27), we obtain $$Eac=jb1\omega 0rk+b1rkv \quad (30)$$

Figure 7A:
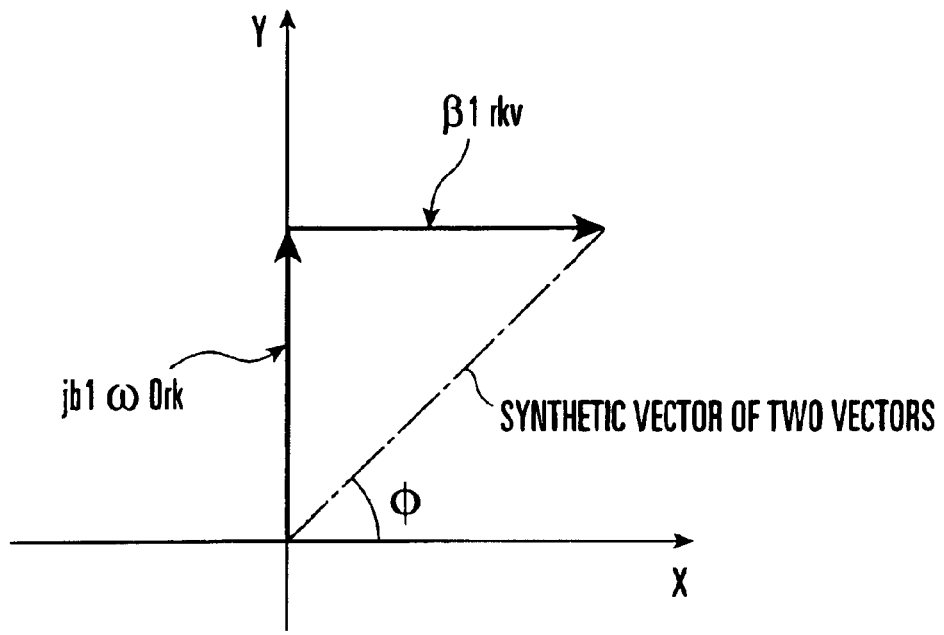
FIGS. 7A and 7B are graphs showing the principle of flow rate measurement with shift correction in the electromagnetic flowmeter according to the first embodiment of the present invention.
Figure 7B:
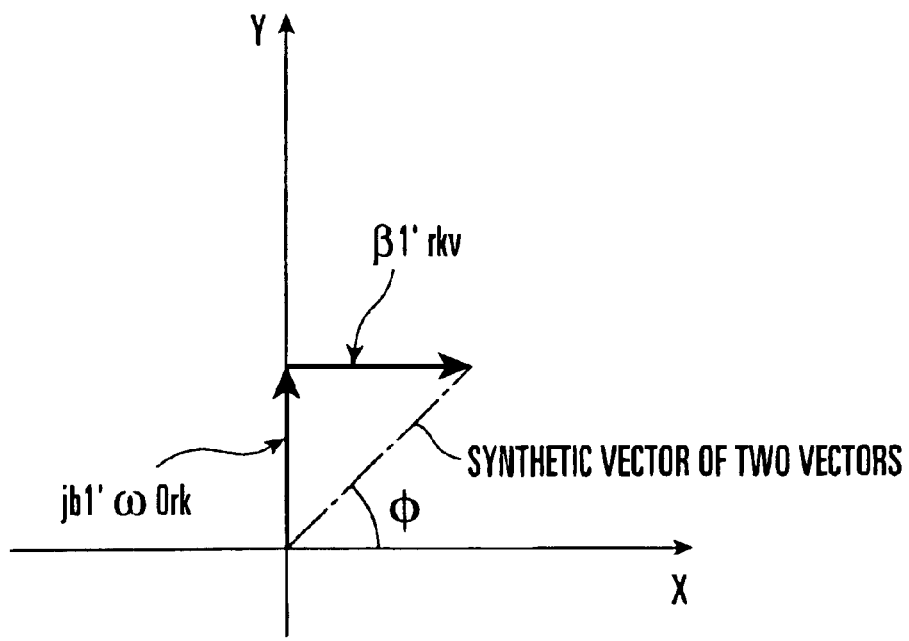

FIGS. 7A and 7B show the principle of flow rate measurement in which the amplitude shift of the magnetic field is corrected in this embodiment. Two vectors representing an interelectrode electromotive force Eac given by equation (30) have a geometrical relationship shown in FIG. 7A. From FIG. 7A and equation (30), we obtain $$\tan(\pi/2 - \phi) = (b1rkv)/(b1\omega 0rk) \quad (31)$$

-continued $$= rkv/(\omega 0 rk)$$

Assume that an amplitude b1 of the magnetic field B1 shifts to b1'. The geometrical relationship between the two vectors representing the interelectrode electromotive force Eac changes from FIG. 7A to FIG. 7B.

Equation (31) is rewritten to $$\tan(\pi/2 - \phi') = (b1'rkv)/(b1'\omega 0 rk) \qquad (32)$$

$$= rkv/(\omega 0 rk)$$

Since the right-hand side of equation (31) equals that of equation (32), $\phi = \phi'$ holds. More specifically, when the amplitude b1 of the magnetic field B1 shifts to b1', the amplitude of the interelectrode electromotive force Eac (the length of the synthetic vector) changes to FIG. 7B. However, a phase difference $\phi$ between a phase $\omega 0 t$ of the exciting current (magnetic field B1) and the interelectrode electromotive force Eac is kept unchanged unless the flow rate of the fluid to be measured changes. Hence, when the flow rate is detected on the basis of the phase difference $\phi$, the flow rate measurement error due to the influence of the shift can automatically be canceled.

To obtain the flow rate of the fluid to be measured, equation (31) is rewritten to $$rkv = \omega 0 rk \tan(\pi/2 - \phi) \qquad (33)$$

On the basis of equation (24), equation (33) can be rewritten to $$V = \alpha 1 \times \tan(\pi/2 - \phi) \text{ for } \alpha 1 = \omega 0/\gamma \qquad (34)$$

where $\alpha 1$ (or $\gamma$) is a coefficient predetermined by calibration or the like. The signal conversion unit 5 detects the electromotive force Eac between the electrodes 2a and 2b and obtains the phase difference $\phi$ between the phase $\omega 0 t$ of the exciting current and the interelectrode electromotive force Eac. The flow rate output unit 6 calculates a flow velocity V of the fluid to be measured, i.e., the flow rate per unit time by using equation (34) on the basis of the phase difference $\phi$ obtained by the signal conversion unit 5.

As described above, as the basic technical idea of the present invention, asymmetrical magnetic fields are applied to the fluid to be measured on both sides of the plane PLN in the measuring pipe 1 to generate a phase difference between the input (exciting current) and the output (electromotive force). A flow rate measurement error due to the shift of the magnetic field state is corrected or removed on the basis of the mechanism of the phase difference. In this embodiment, the flow rate is calculated by using an asymmetrical exciting characteristic parameter. (the phase difference $\phi$ between the exciting current and the interelectrode electromotive force Eac) which depends on the flow rate of the fluid to be measured and does not depend on the shift of the amplitude of the magnetic field B1. Accordingly, the flow rate can be calculated while automatically canceling the flow rate measurement error due to the influence of in-phase component noise (the shift of the amplitude of the magnetic field). Hence, accurate flow rate measurement can be executed.

Second Embodiment

Figure 8:
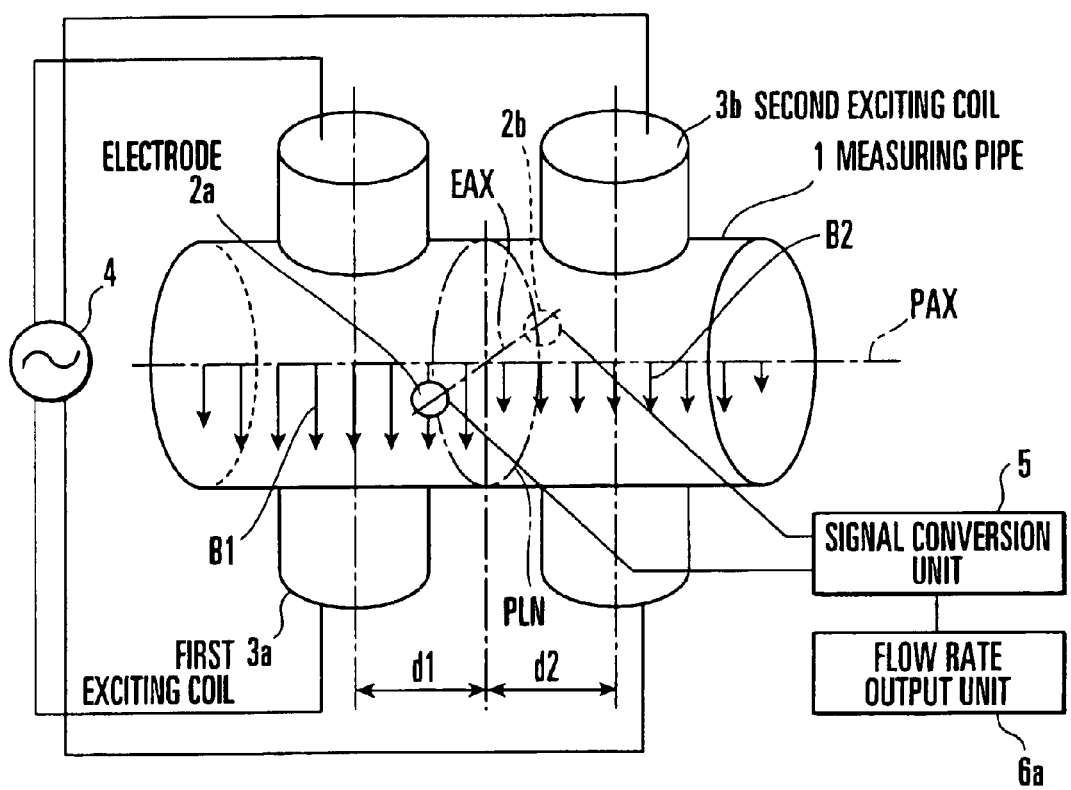
FIG. 8 is a block diagram showing the arrangement of an electromagnetic flowmeter according to the second embodiment of the present invention.

FIG. 8 is a block diagram showing the arrangement of an electromagnetic flowmeter according to the second embodiment of the present invention. The same reference numerals as in FIGS. 1 and 6 denote the same components in FIG. 8. The electromagnetic flowmeter according to this embodiment has a measuring pipe 1, electrodes 2a and 2b, first and second exciting coils 3a and 3b, a power supply unit 4a, a signal conversion unit 5, and a flow rate output unit 6a. A plane PLN which includes the electrodes 2a and 2b and is perpendicular to the direction of a measuring pipe axis PAX is defined as a boundary in the measuring pipe 1. In this case, the first and second exciting coils 3a and 3b apply asymmetrical magnetic fields to the fluid to be measured on both sides of the plane PLN, i.e., the boundary in the measuring pipe 1. The power supply unit 4a supplies exciting currents having the same frequency and same phase to the first and second exciting coils 3a and 3b to generate magnetic fields. The signal conversion unit 5 obtains the phase difference between the exciting current and an interelectrode electromotive force detected by the electrodes 2a and 2b. The flow rate output unit 6a calculates the flow rate of the fluid to be measured on the basis of the phase difference obtained by the signal conversion unit 5.

This embodiment corresponds to a structure in which $b1 \neq b2$, and $\theta 2 = 0$ in equation (27) described above. The first exciting coil 3a is arranged, e.g., downstream of the plane PLN at a position separated from, it by an offset distance d1. The second exciting coil 3b is arranged, e.g., upstream of the plane PLN at a position separated from it by an offset distance d2, i.e., on the opposite side of the first exciting coil 3a with respect to the plane PLN. Exciting currents having the same frequency, same phase, and different amplitudes are supplied from the power supply unit 4a. Accordingly, asymmetrical magnetic fields are formed on both sides of the plane PLN in the measuring pipe 1.

Of the magnetic field generated from the first exciting coil 3a when the exciting current is supplied from the power supply unit 4a, a magnetic field component B1 which is perpendicular, on an electrode axis EAX that connects the electrodes 2a and 2b, to both the electrode axis EAX and the measuring pipe axis PAX is given by equation (35) because $\theta 1 = 0$ in equation (3). Of the magnetic field generated from the second exciting coil 3b, a magnetic field component B2 which is perpendicular to both the electrode axis EAX and the measuring pipe axis PAX on the electrode axis EAX is given by equation (36) because $\theta 2 = 0$ in equation (4)

$$B1 = b1 \cos(\omega 0 t) \qquad (35)$$

$$B2 = b2 \cos(\omega 0 t) \qquad (36)$$

When $\theta 2 = 0$ in equation (27), we obtain $$Eac = jb1\omega 0 rk - jb2\omega 0 rk + b1 rkv + b2 rkv \qquad (37)$$

Figure 9A:
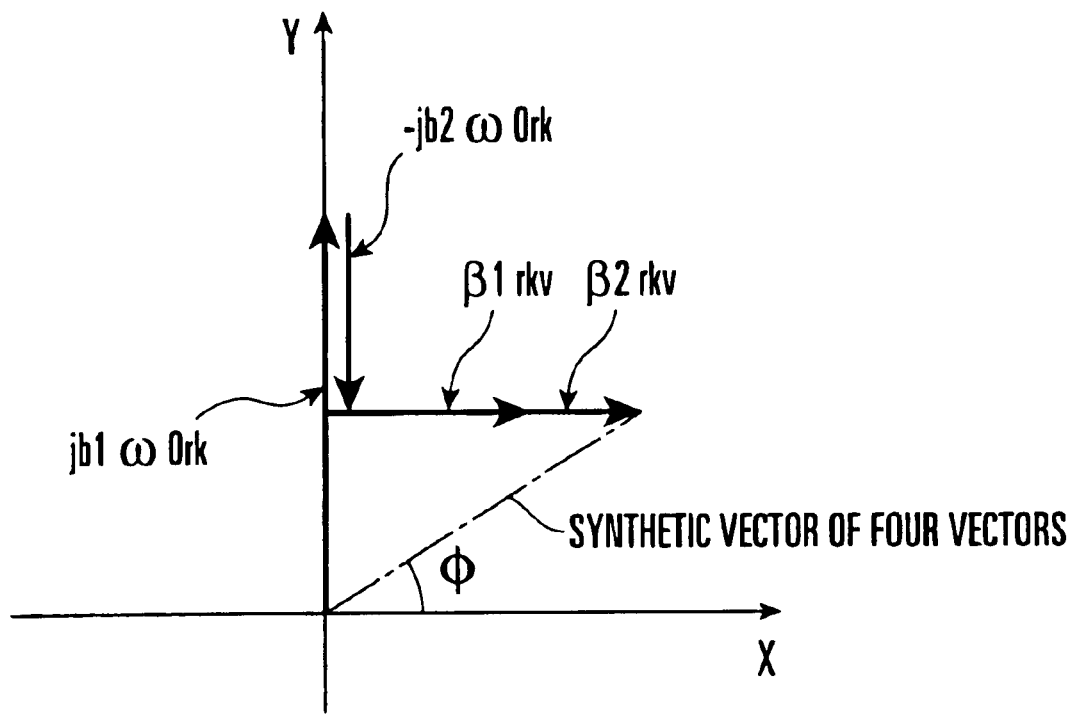
FIGS. 9A and 9B are graphs showing the principle of flow rate measurement with shift correction in the electromagnetic flowmeter according to the second embodiment of the present invention.
Figure 9B:
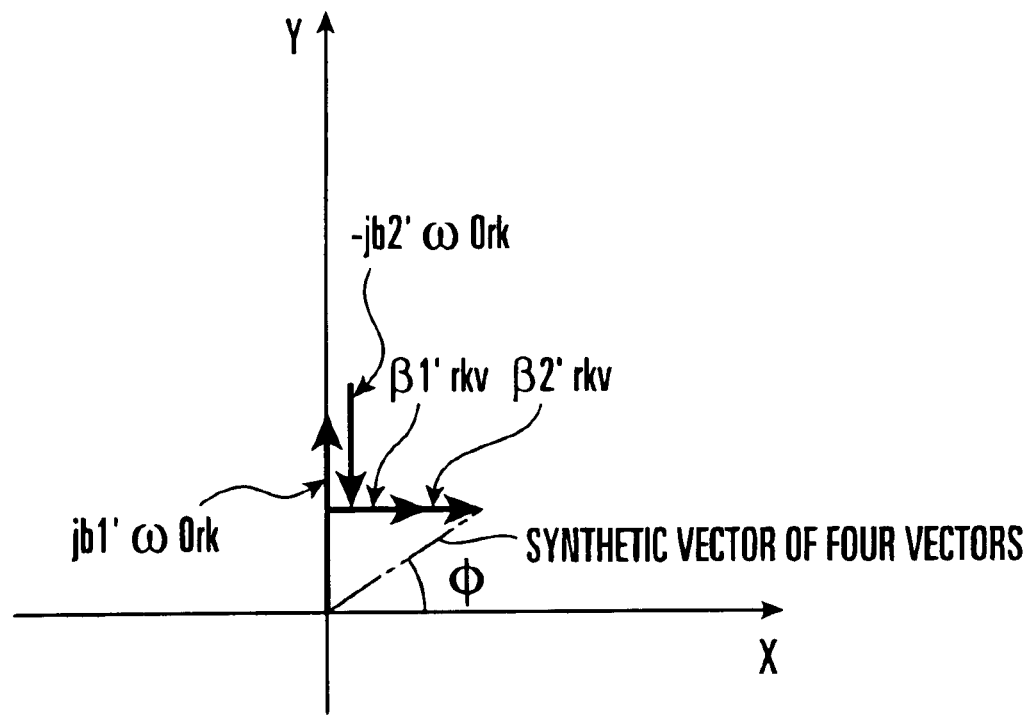

FIGS. 9A and 9B show the principle of flow rate measurement of in this embodiment. Four vectors representing an interelectrode electromotive force Eac given by equation (37) have a geometrical relationship shown in FIG. 9A. From FIG. 9A and equation (37), we obtain $$\tan(\pi/2 - \phi) = \{(b1+b2)rkv\}/\{(b1-b2)\omega 0 rk\} \qquad (38)$$

Assume that an amplitude b1 of the magnetic field B1 shifts to b1', and an amplitude b2 of the magnetic field B2 shifts to b2'. The geometrical relationship between the four vectors representing the interelectrode electromotive force Eac changes from FIG. 9A to FIG. 9B. Equation (38) is rewritten to $$\tan(\pi/2 - \phi') = \{(b1'+b2')rkv\}/\{(b1'-b2')\omega 0 rk\} \qquad (39)$$

The power supply unit 4a which supplies the exciting currents is commonly used for the first exciting coil 3a and second exciting coil 3b. Hence, even when the amplitude b1 shifts to b1', and the amplitude b2 shifts to b2', the following relationship holds $$b1'/b1 = b2'/b2 = \rho \quad (40)$$

From equation (40), equation (39) is written to $$\tan(\pi/2 - \phi') = \{\rho(b1+b2)rkv\}/\{\rho(b1-b2)\omega 0rk\} \quad (41)$$
$$= \{(b1+b2)rkv\}/\{(b1-b2)\omega 0rk\}$$

Since the right-hand side of equation (38) equals that of equation (41), φ=φ' holds. More specifically, when the amplitude b1 of the magnetic field B1 shifts to b1', and the amplitude b2 of the magnetic field B2 shifts to b2', the amplitude of the interelectrode electromotive force Eac (the length of the synthetic vector) changes to FIG. 9B. However, a phase difference φ between a phase ω0t of the exciting current (magnetic fields B1 and B2) and the interelectrode electromotive force Eac is kept unchanged unless the flow rate of the fluid to be measured changes. Hence, when the flow rate is detected on the basis of the phase difference φ, the flow rate measurement error due to the influence of the shift can automatically be canceled.

To obtain the flow rate of the fluid to be measured, equation (38) is rewritten to $$rkv = \{(b1-b2)/(b1+b2)\}\omega 0rk \tan(\pi/2-\phi) \quad (42)$$

On the basis of equation (24), equation (42) can be rewritten to $$V = \alpha 1 \times \tan(\pi/2-\phi) \text{ for } \alpha 1 = \{(b1-b2)/(b1+b2)\}\omega 0/\gamma \quad (43)$$

where α1 (or γ) is a coefficient predetermined by calibration. As in the first embodiment, the signal conversion unit 5 detects the electromotive force Eac between the electrodes 2a and 2b and obtains the phase difference φ between the phase ω0t of the exciting currents (magnetic fields B1 and B2) and the interelectrode electromotive force Eac. The flow rate output unit 6a calculates a flow velocity V of the fluid to be measured by using equation (43) on the basis of the phase difference φ obtained by the signal conversion unit 5. With the above arrangement, the same effect as in the first embodiment can be obtained.

Third Embodiment

Figure 10:
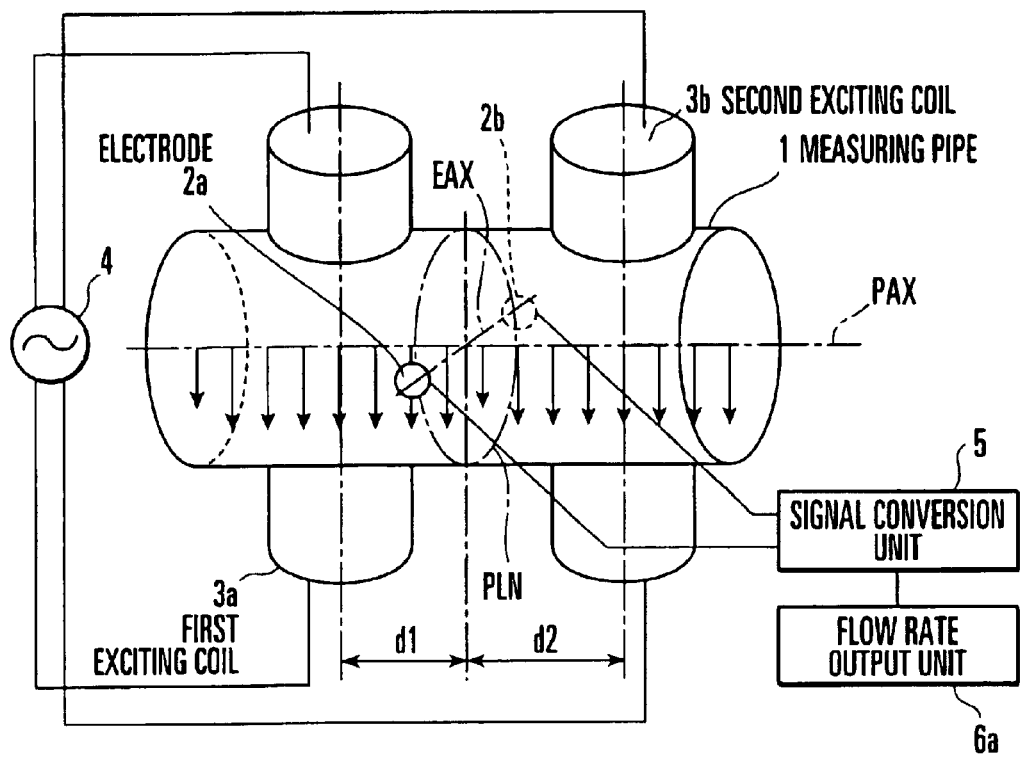
FIG. 10 is a block diagram showing the arrangement of an electromagnetic flowmeter according to the third embodiment of the present invention.

FIG. 10 is a block diagram showing the arrangement of an electromagnetic flowmeter according to the third embodiment of the present invention. The same reference numerals as in FIGS. 1, 6, and 8 denote the same components in FIG. 10. In the second embodiment, the offset distance d1 from the plane PLN to the axis of the first exciting coil 3a equals the offset distance d2 from the plane PLN to the axis of the second exciting coil 3b so that the exciting coils are arranged symmetrically. Instead, as shown in FIG. 10, first and second exciting coils 3a and 3b may be arranged at different offset distances d1 and d2.

In this embodiment, since asymmetrical magnetic fields can be formed on both sides of a plane PLN in a measuring pipe 1 by asymmetrically arranging the first and second exciting coils 3a and 3b. For this reason, the same exciting current may be supplied for a power supply unit 4a to the first and second exciting coils 3a and 3b. The remaining components are the same as in the second embodiment.

Fourth Embodiment

Figure 11:
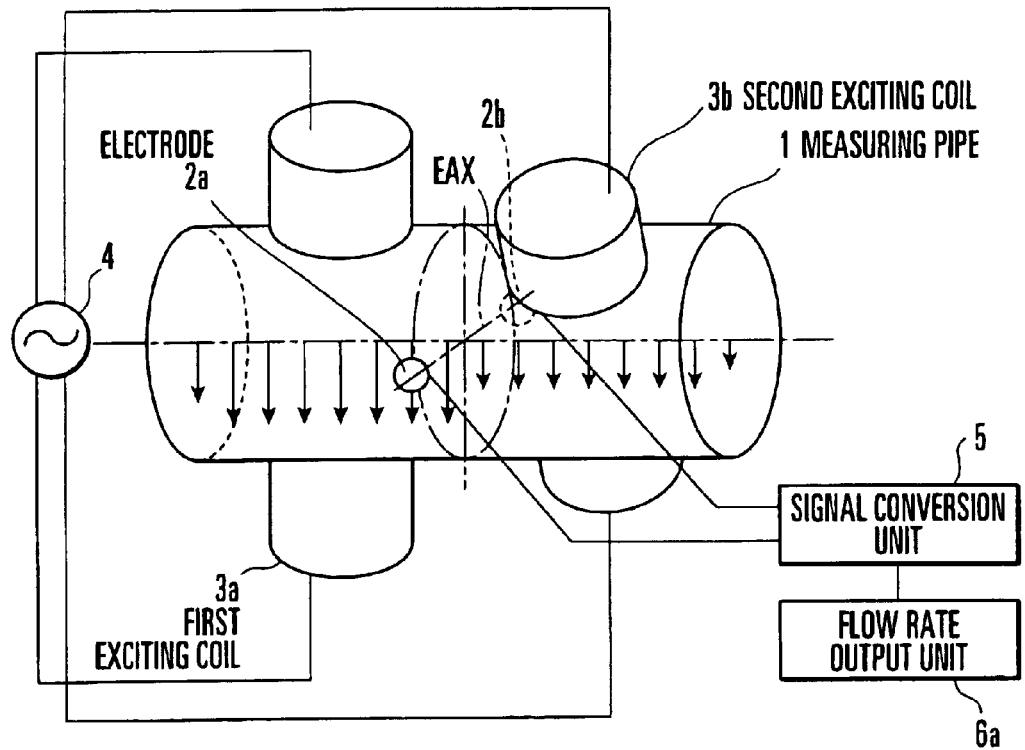
FIG. 11 is a block diagram showing the arrangement of an electromagnetic flowmeter according to the fourth embodiment of the present invention.

FIG. 11 is a block diagram showing the arrangement of an electromagnetic flowmeter according to the fourth embodiment of the present invention. The same reference numerals as in FIGS. 1, 6, and 8 denote the same components in FIG. 11. In the second embodiment, the angle made by the electrode axis EAX and the axis of the first exciting coil 3a equals that made by the electrode axis EAX and the axis of the second exciting coil 3b (both angles are 90°). Instead, as shown in FIG. 11, first and second exciting coils 3a and 3b may be arranged such that the angle made by an electrode axis EAX and the axis of the first exciting coil 3a becomes different from that made by the electrode axis EAX and the axis of the second exciting coil 3b.

Accordingly, magnetic fields B1 and B2 can have different amplitudes b1 and b2. For this reason, the same exciting current may be supplied for a power supply unit 4a to the first and second exciting coils 3a and 3b. The remaining components are the same as in the second embodiment.

Fifth Embodiment

Figure 12:
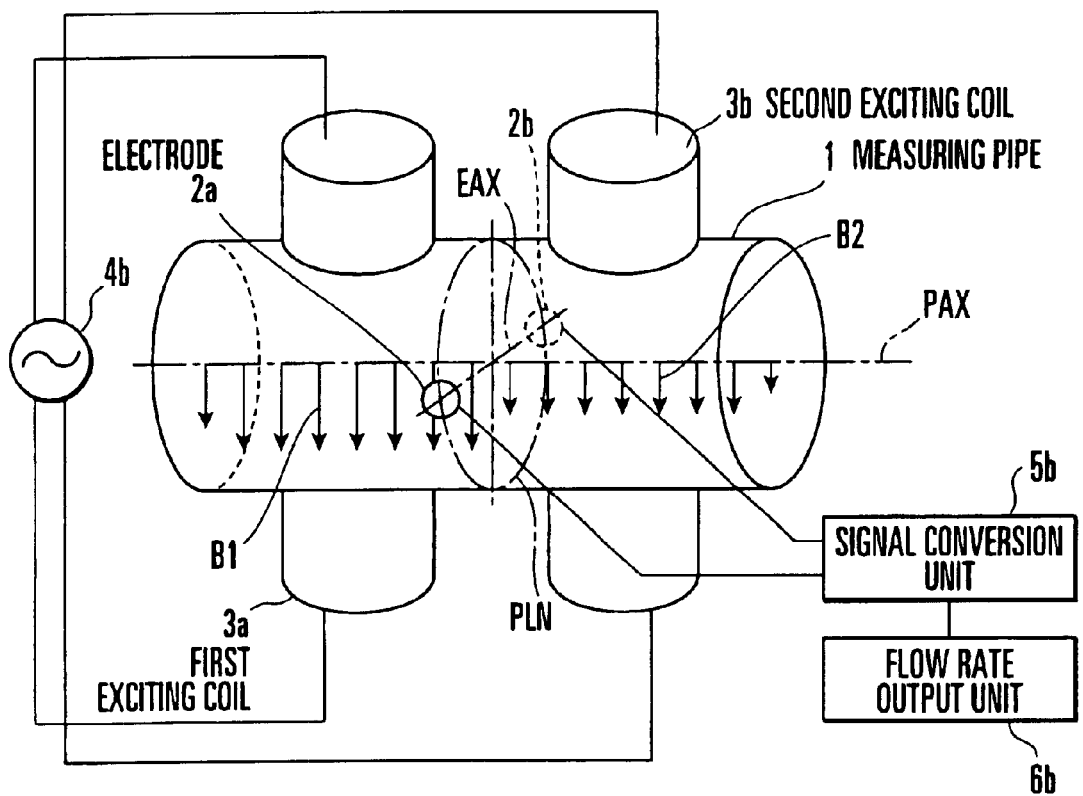
FIG. 12 is a block diagram showing the arrangement of an electromagnetic flowmeter according to the fifth embodiment of the present invention.

FIG. 12 is a block diagram showing the arrangement of an electromagnetic flowmeter according to the fifth embodiment of the present invention. The same reference numerals as in FIGS. 1, 6, and 8 denote the same components in FIG. 12. The electromagnetic flowmeter according to this embodiment has a measuring pipe 1, electrodes 2a and 2b, first and second exciting coils 3a and 3b, a power supply unit 4b, a signal conversion unit 5b, and a flow rate output unit 6b. Exciting currents supplied to the first and second exciting coils 3a and 3b have the same frequency. The power supply unit 4b supplies the exciting currents to the first and second exciting coils 3a and 3b while changing the phase difference between the exciting currents to generate magnetic fields. The signal conversion unit 5b obtains the amplitude of an interelectrode electromotive force detected by the electrodes 2a, and 2b in each of at least two states in which the exciting currents have different phase differences, and obtains the ratio of the amplitudes. The flow rate output unit 6b calculates the flow rate of the fluid to be measured on the basis of the amplitude ratio obtained by the signal conversion unit 5b.

This embodiment corresponds to a structure in which b1=b2 in equation (27) described above. For the descriptive convenience, amplitudes b1 and b2 of magnetic fields B1 and B2 have a relationship given by b1=b2=b. The first and second exciting coils 3a and 3b can have any arrangement as long as b1=b2 can hold. The exciting coils can be arranged either symmetrically as in the second embodiment, or asymmetrically as in the third or fourth embodiment. Exciting currents to be supplied to the first and second exciting coils 3a and 3b can have either the same amplitude or different amplitudes.

Since b1=b, and θ1=0 in equation (3), the magnetic field B1 generated from the first exciting coil 3a is given by equation (44). Since b2=b in equation (4), the magnetic field B2 generated from the second exciting coil 3b is given by equation (45).

$$B1 = b \cos(\omega 0 t) \quad (44)$$

$$B2 = b \cos(\omega 0 t - \theta 2) \quad (45)$$

When b1=b2=b in equation (27), we obtains $$Eac = jb\omega 0 rk + b\omega 0 rk \exp\{j(-\pi/2+\theta 2)\} + brkv + brkv \exp(j\theta 2) \quad (46)$$

Figure 13:
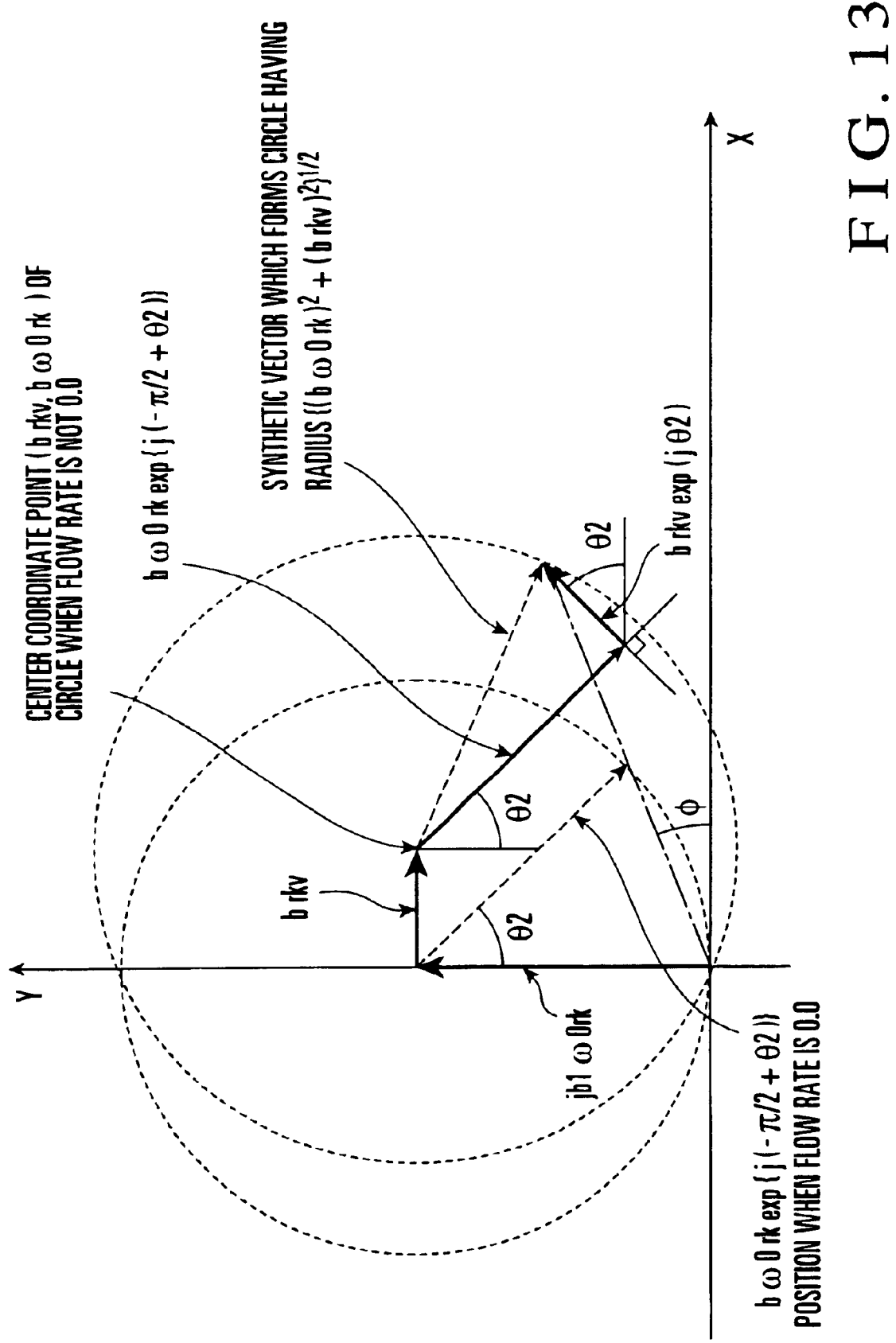
FIG. 13 is a graph showing the principle of flow rate measurement with shift correction in the electromagnetic flowmeter according to the fifth embodiment of the present invention.

FIGS. 13 to 18 show the principle of flow rate measurement in this embodiment. Four vectors representing an interelectrode electromotive force Eac given by equation (46) have a geometrical relationship shown in FIG. 13. Referring to FIG. 13, vectors corresponding to the respective terms of equation (46) when the flow rate is not 0 are indicated by solid lines. The locus of the synthetic vector forms a circle having a center at (brkv,bω0rk) on the complex plane. When the flow rate is 0, the third and fourth terms of equation (46) are 0. Hence, the locus of the synthetic vector forms a circle having a center at (0,bω0rk) on the complex plane.

Figure 14:
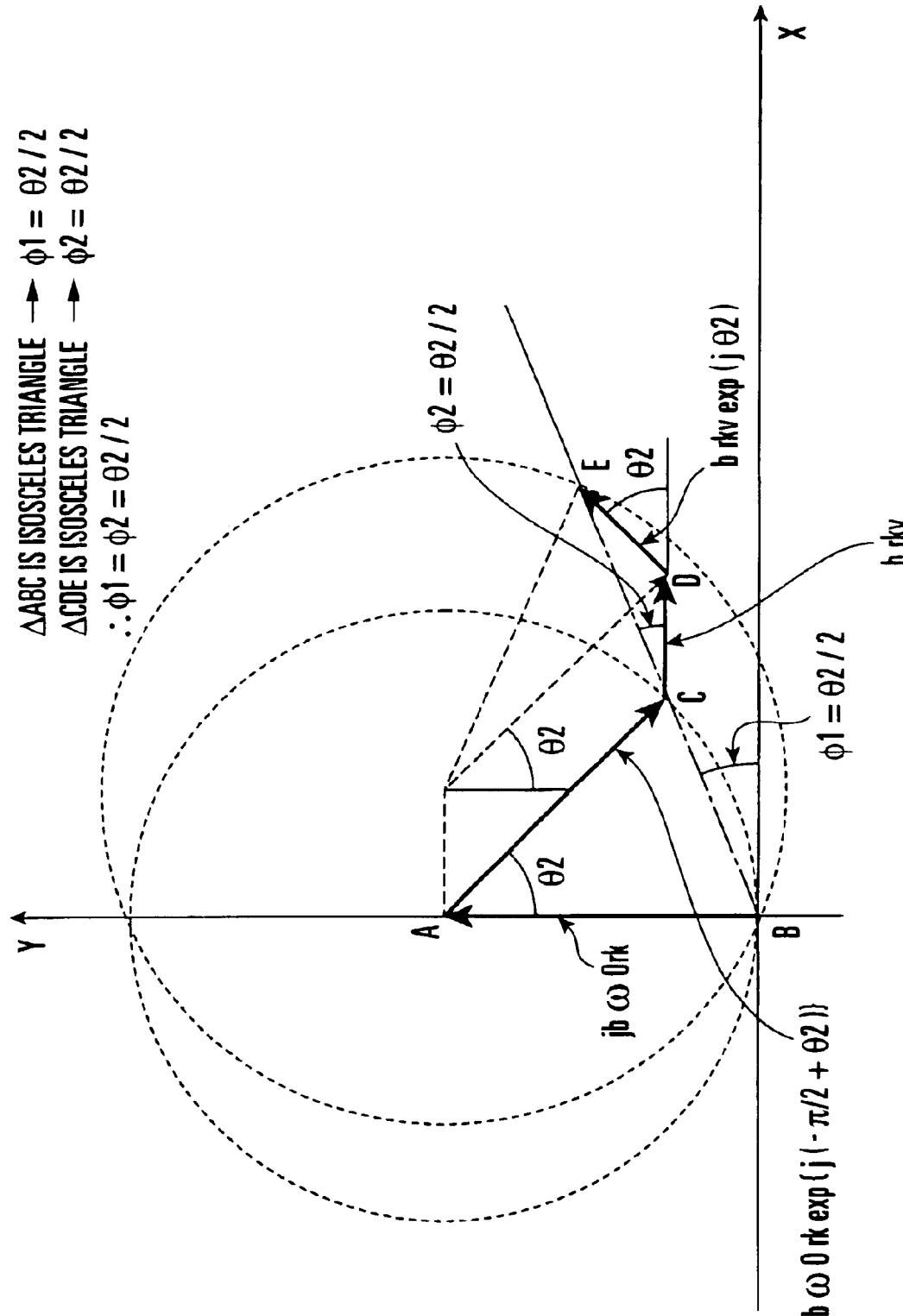
FIG. 14 is a graph showing the principle of flow rate measurement with shift correction in the electromagnetic flowmeter according to the fifth embodiment of the present invention.
Figure 15:
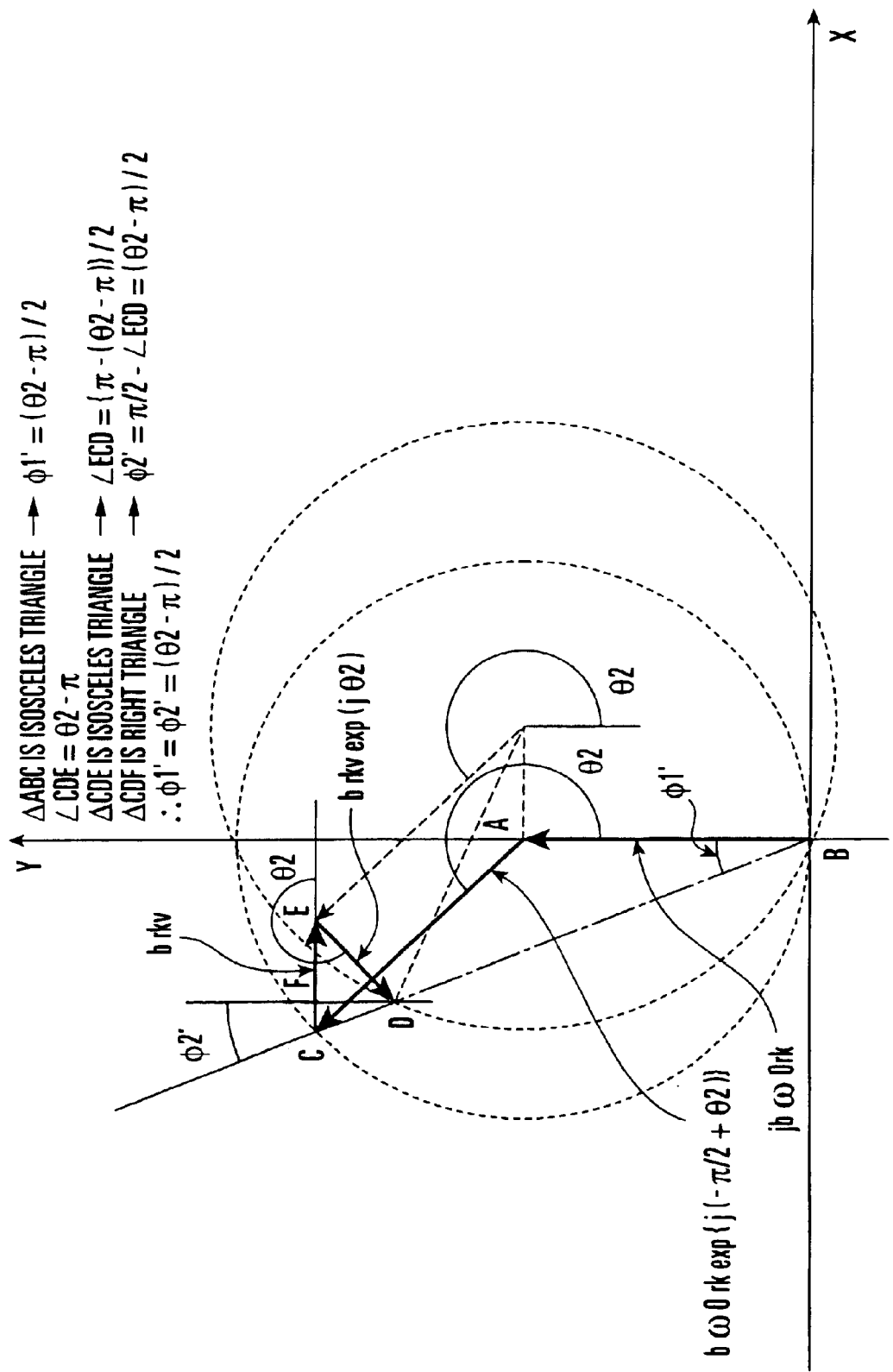
FIG. 15 is a graph showing the principle of flow rate measurement with shift correction in the electromagnetic flowmeter according to the fifth embodiment of the present invention.
Figure 16:
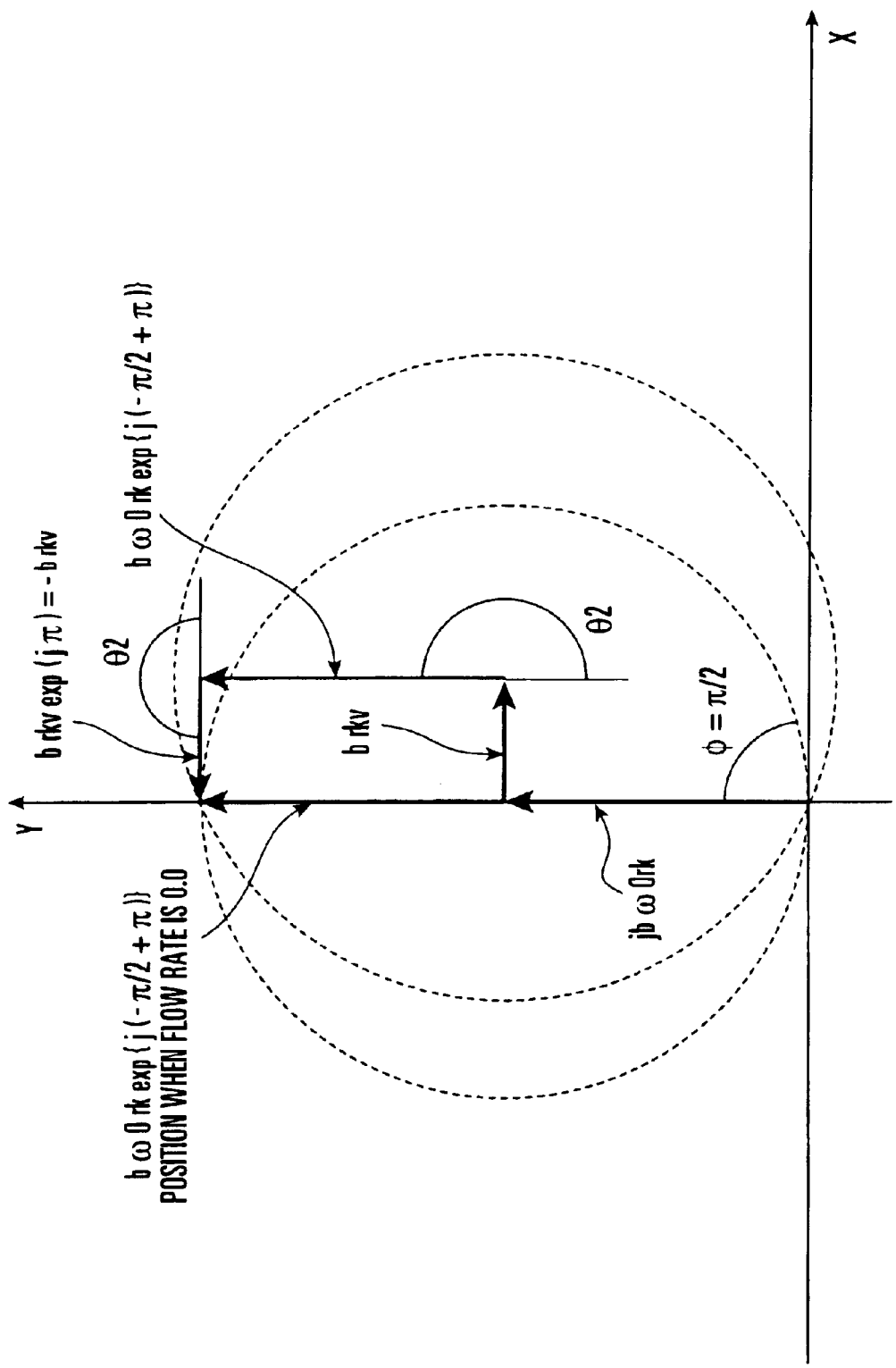
FIG. 16 is a graph showing the principle of flow rate measurement with shift correction in the electromagnetic flowmeter according to the fifth embodiment of the present invention.

As shown in FIGS. 14 to 16, an angle φ (the phase difference between a phase ω0t and the interelectrode electromotive force Eac) of the synthetic vector obtained by synthesizing the four vectors of equation (46) is ½ a phase difference θ2 between the exciting current supplied to the first exciting coil 3a and that supplied to the second exciting coil 3b (the magnetic fields B1 and B2). This relationship will be described below.

FIG. 14 shows the geometrical relationship between the four vectors of equation (46) when θ2<π (180°). When the flow rate of the fluid to be measured is 0, equation (46) can be rewritten to $$Eac = jb\omega 0 rk + b\omega 0 rk \exp\{j(-\pi/2 + \theta 2)\} \quad (47)$$

When the flow rate is 0, ΔABC formed by two complex vectors jbω0rk and bω0rkexp{j(-π/2+θ2)} and their synthetic vector is an isosceles triangle. The magnitude of an angle <ABC made by sides AB and BC is (π-θ2)/2. At this time, the angle (phase) of the synthetic vector is d1=θ2/2.

On the other hand, ΔCDE formed by two vectors brkv and brkvexp(jθ2) generated when the flow rate is not 0 is an isosceles triangle. The magnitude of an angle <ECD made by sides EC and CD is θ2/2. That is, when the flow rate of the fluid to be measured increases, the angle of the synthetic vector is θ2=θ2/2.

FIG. 15 shows the geometrical relationship between the four vectors of equation (46) when θ2>π (180°). When the flow rate of the fluid to be measured is 0, ΔABC formed by the two complex vectors jbω0rk and bω0rkexp{j(-π/2+θ2)} and their synthetic vector is an isosceles triangle. The magnitude of the angle <ABC is (θ2-π)/2. At this time, an angle φ1'+π/2 of the synthetic vector is θ2/2.

On the other hand, ΔCDE formed by the two vectors brkv and brkvexp(jθ2) generated when the flow rate is not 0 is an isosceles triangle. The magnitude of the angle <ECD is {π-(θ2-π)}/2=-θ2/2. That is, when the flow rate of the fluid to be measured increases, the direction (phase) in which the synthetic vector changes is φ2'+π/2=(π/2-/<ECD)+π/2=θ2/2 from C to D in FIG. 15.

FIG. 16 shows the geometrical relationship between the four vectors of equation (46) when θ2+=π (180°). When the flow rate of the fluid to be measured is 0, the synthetic vector is on an imaginary axis Y of the complex vectors. The two vectors brkv and brkvexp(jθ2) generated when the flow rate is not 0 have the same magnitude and reverse directions. Hence, the end point of the synthetic vector does not change. More specifically, when θ2=π, the angle of the synthetic vector is always θ2/2=π/2. The interelectrode electromotive force Eac remains constant independlety of the flow rate.

Figure 17:
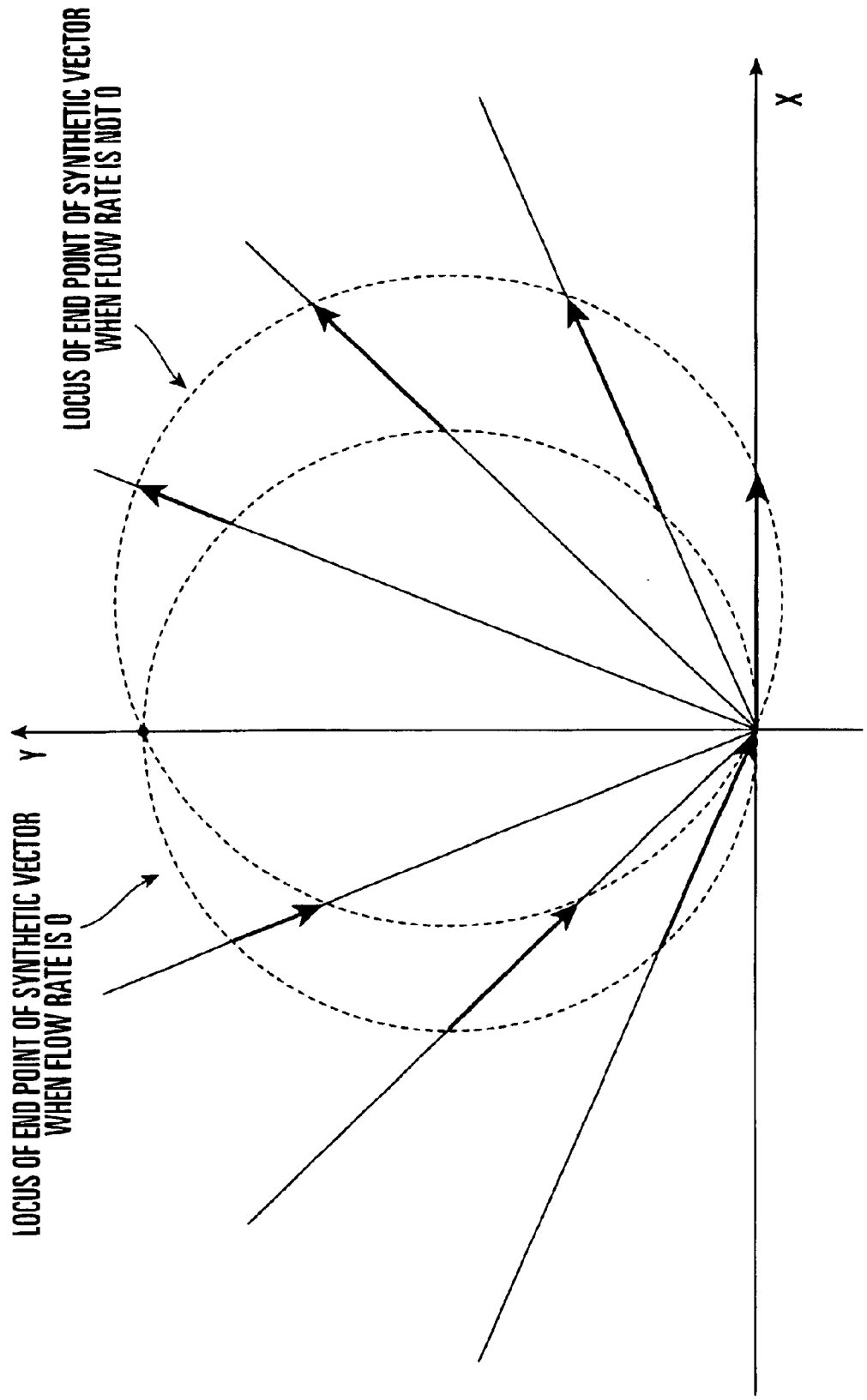
FIG. 17 is a graph showing the principle of flow rate measurement with shift correction in the electromagnetic flowmeter according to the fifth embodiment of the present invention.

As described above, the phase φ of the synthetic vector is ½ the phase difference θ2 between the exciting current supplied to the first exciting coil 3a and that supplied to the second exciting coil 3b and is not affected by the flow rate of the fluid to be measured. That is, when the flow rate changes, the end point of the synthetic vector moves as shown in FIG. 17 while maintaining the phase difference θ2. The characteristic of the prior art corresponds to movement on the real axis.

When θ2=0 in equation (46), we obtain $$Eac = brkv + brkv \quad (48)$$

When θ2=π in equation (46), we obtain $$Eac = jb\omega 0 rk + jb\omega 0 rk \quad (49)$$

Figure 18A:
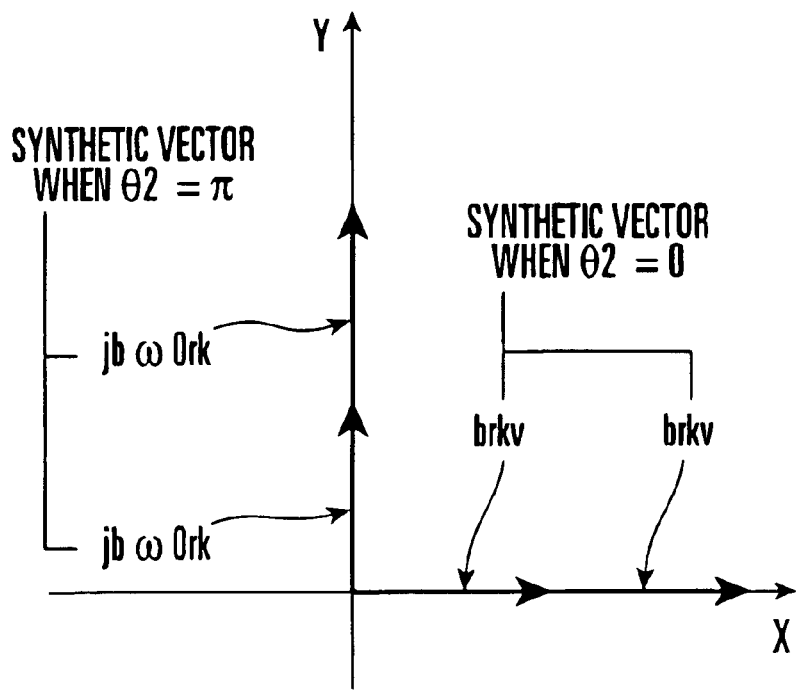
FIGS. 18A and 18B are graphs showing the principle of flow rate measurement with shift correction in the electromagnetic flowmeter according to the fifth embodiment of the present invention.
Figure 18B:
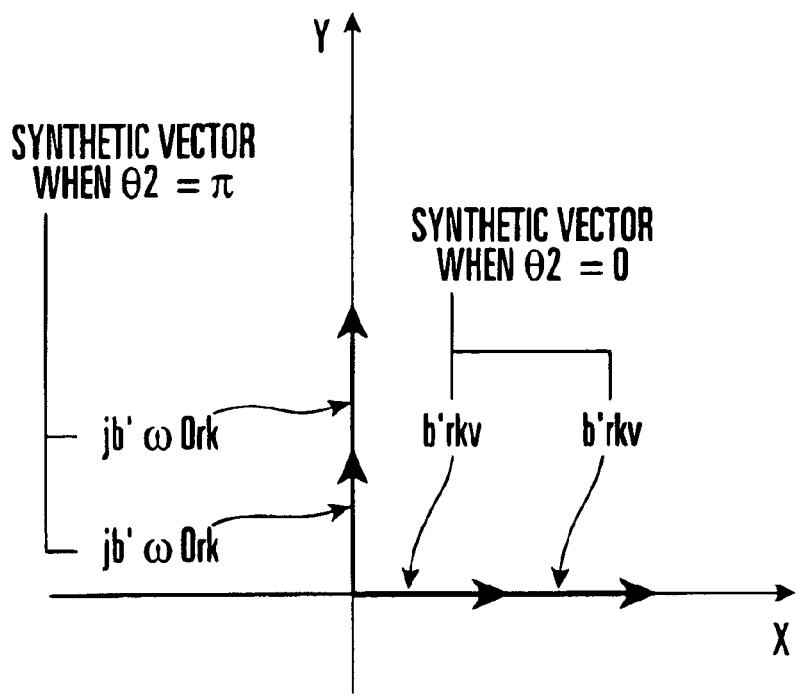

FIGS. 18A and 18B show the principle of flow rate measurement with shift correction in this embodiment. FIG. 18A shows the geometrical relationship between two vectors representing the interelectrode electromotive force Eac when θ2=0 and the geometrical relationship between two vectors representing the interelectrode electromotive force Eac when θ2=π.

From FIG. 18A and equations (48) and (49), a ratio R of an amplitude (the length of the synthetic vector) $A_{\theta 2=0}$ of the interelectrode electromotive force Eac when the phase difference θ2=0 to the amplitude $A_{\theta 2=0}$ of the interelectrode electromotive force Eac when the phase difference θ2=π is given by $$R = A_{\theta 2=0} / A_{\theta 2=\pi} = (brkv + brkv)/(b\omega 0 rk + b\omega 0 rk) \quad (50)$$

$$= rkv/(\omega 0 rk)$$

Assume that an amplitude b of the magnetic fields B1 and B2 shifts to b'. The geometrical relationship between the vectors representing the interelectrode electromotive force Eac changes from FIG. 18A to FIG. 18B. Equation (50) is rewritten to $$R' = A'_{\theta 2=0} / A'_{\theta 2=\pi} \quad (51)$$

$$= (b'rkv + b'rkv)/(b'\omega 0 rk + b'\omega 0 rk)$$

$$= rkv/(\omega 0 rk)$$

Since the right-hand side of equation (50) equals that of equation (51), R=R' holds. More specifically, the amplitude ratio R of the interelectrode electromotive force Eac does not change even when the amplitude b of the magnetic fields B1 and B2 shifts to b'. While switching is executed by the power supply unit 4b such that the phase difference θ2 between the exciting current supplied to the first exciting coil 3a and that supplied to the second exciting coil 3b takes two values, an amplitude is obtained in correspondence with each value. When the flow rate is detected on the basis of the amplitude ratio R, the flow rate measurement error due to the influence of the shift can automatically be canceled.

To obtain the flow rate of the fluid to be measured, equation (50) is rewritten to $$rkv = \omega 0 rk (A_{\theta 2=0}/A_{\theta 2=\pi}) = \omega 0 rkR \quad (52)$$

On the basis of equation (24), equation (52) can be rewritten to $$V = \alpha 2 \times R \text{ for } \alpha 2 = \omega 0/\gamma \quad (53)$$

Equation (53) is the formula of the flow velocity V when exciting currents with the phase difference θ2=0 and exciting currents with the phase difference θ2=π are supplied to the first and second exciting coils 3a and 3b. A formula generalized from equation (53) will be derived next. Referring to FIG. 14, a magnitude |BE| of the synthetic vector obtained by synthesizing the four vectors of equation (46) is given by $$|BE| = 2La + 2Lb \text{ for } La = b\omega 0 rk \sin(\theta 2/2) \, Lb = brkv \cos(\theta 2/2) \quad (54)$$

where La is a length obtained by dividing a line segment BC in FIG. 14 into two equal parts, and Lb is a length obtained by dividing a line segment CE in FIG. 14 into two equal parts. From equation (54), we obtain $$|BE| = 2b\omega 0 rk \sin(\theta 2/2) + 2brkv \cos(\theta 2/2) \quad (55)$$

Next, an arbitrary value $\chi$ ($\chi$ is a real number) which satisfies phase difference $\theta 2 = 2\chi$ is taken. At this time, from equation (55), a magnitude $|BE|_{\theta 2=2\chi}$ of the synthetic vector BE is given by $$|BE|_{\theta 2=2\chi} = 2b\omega 0 rk \sin\chi + 2brkv \cos\chi \quad (56)$$

An arbitrary value $\psi$ ($\psi$ is a real number) which satisfies phase difference $\theta 2 = 2\psi$ is taken. At this time, from equation (55) a magnitude $|BE|_{\theta 2=2\psi}$ of the synthetic vector BE is given by $$|BE|_{\theta 2=2\psi} = 2b\omega 0 rk \sin\psi + 2brkv \cos\psi \quad (57)$$

$|BE|_{\theta 2=2\chi}$ is an amplitude $A_{\theta 2=2\chi}$ of the interelectrode electromotive force Eac when phase difference $\theta 2 = 2\chi$. $|BE|_{\theta 2=2\psi}$ is an amplitude $A_{\theta 2=2\psi}$ of the interelectrode electromotive force Eac when phase difference $\theta 2 = 2\psi$. From equations (56) and (57) the ratio R of the amplitude $A_{\theta 2=2\chi}$ of the interelectrode electromotive force Eac when phase difference $\theta 2 = 2\chi$ to the amplitude $A_{\theta 2=2\psi}$ of the interelectrode electromotive force Eac when phase difference $\theta 2 = 2\psi$ is given by $$R = A_{\theta 2=2\chi}/A_{\theta 2=2\phi} \quad (58)$$
$$= (2b\omega 0 rk \sin\chi + 2brkv\cos\chi)/(2b\omega 0 rk \sin\psi + 2brkv\cos\psi)$$
$$= (\omega 0 rk \sin\chi + rkv\cos\chi)/(\omega 0 rk \sin\psi + rkv\cos\psi)$$

Equation (58) representing the ratio R of the amplitude of the interelectrode electromotive force Eac has no term of the amplitude b of the magnetic fields B1 and B2. For this reason, even when the amplitude b of the magnetic fields B1 and B2 shifts, the ratio R does not change. Hence, when switching is executed by the power supply unit 4b such that the phase difference $\theta 2$ between the exciting current supplied to the first exciting coil 3a and that supplied to the second exciting coil 3b takes the two values $2\chi$ and $2\psi$, an amplitude is obtained in correspondence with each value. When the flow rate is detected on the basis of the amplitude ratio R, the flow rate measurement error due to the influence of the shift can automatically be canceled.

When $P = \omega 0 rk$ and $Q = rkv$, equation (58) can be rewritten to $$R = P\sin\chi + Q\cos\chi)/(P\sin\psi + Q\cos\psi) \quad (59)$$
$$= \{(P^2 + Q^2)^{1/2}\sin(\chi + \tau)/(P^2 + Q^2)^{1/2}\sin(\psi + \tau)\}$$
for $\tau = \tan^{-1}(Q/P)$ From equation (59), we obtain $$R = \sin(\chi + \tau)/\sin(\psi + \tau) \quad (60)$$
$$= (\sin\chi\cos\tau + \cos\chi\sin\tau)/(\sin\psi\cos\tau + \cos\psi\sin\tau)$$
$$= (\sin\chi + \cos\chi\tan\tau)/(\sin\psi + \cos\psi\tan\tau)$$

From equation (60), we obtain $$R \sin\psi + R \cos\psi\tan\tau = \sin\chi + \cos\chi\tan\tau \quad (61)$$

From equation (61), we obtain $$\tan\tau (R\cos\psi - \cos\chi) = \sin\chi - R\sin\psi \quad (62)$$

From equation (62), we obtain $$\tan\tau = (-R\sin\psi + \sin\chi)/(R\cos\psi - \cos\chi) \quad (63)$$

From $\tau = \tan^{-1}(Q/P)$, we obtain $$\tan\tau = Q/P = rkv/(\omega 0 rk) \quad (64)$$

From equations (64) and (24), equation (63) can be rewritten to $$V = (\omega 0/\gamma) \times \{(-R\sin\psi + \sin\chi)/(R\cos\psi - \cos\chi)\} \quad (65)$$
$$= (-\omega 0/\gamma) \times \{(R\sin\psi - \sin\chi)/(R\cos\psi - \cos\chi)\}$$
$$= \alpha 2 \times \{(R\sin\psi - \sin\chi)/(R\cos\psi - \cos\chi)\}$$
for $\alpha 2 = -\omega 0/\gamma$ where $\alpha 2$ (or $\gamma$) is a coefficient predetermined by calibration or the like. With the above processing, the formula of the flow velocity V when exciting currents with the phase difference $\theta 2 = 2\chi$ and exciting currents with the phase difference $\theta 2 = 2\psi$ are supplied to the first and second exciting coils 3a and 3b can be obtained. Equation (65) is obtained by generalizing equation (53). When $\theta 2 = 2\chi = 0$ and $\theta 2 = 2\psi = \pi$ in equation (65), equation (53) can be obtained.

The power supply unit 4b supplies exciting currents with the phase difference $\theta 2 = 2\chi$ and exciting currents with the phase difference $\theta 2 = 2\psi$ to the first and second exciting coils 3a and 3b. The signal conversion unit 5b obtains the amplitude of the interelectrode electromotive force Eac detected by the electrodes 2a and 2b in each of the two states with different phase differences $\theta 2$ and obtains the ratio R of the amplitudes. The flow rate output unit 6b calculates the flow velocity V of the fluid to be measured by using equation (65) on the basis of the amplitude ratio R obtained by the signal conversion unit 5b. With the above arrangement, the same effect as in the first embodiment can be obtained. As a characteristic feature of this embodiment, a plurality of predetermined discrete values are used for the phase difference $\theta 2$. The phase difference $\theta 2$ is not limited to two values.

Sixth Embodiment

The sixth embodiment of the present invention will be described next. An electromagnetic flowmeter according to this embodiment has the same arrangement as that of the fifth embodiment, and a description thereof will be made with reference to FIG. 12. A power supply unit 4b of this embodiment supplies exciting currents having the same frequency to first and second exciting coils 3a and 3b and continuously switches the phase difference between the exciting currents. A signal conversion unit 5b obtains the amplitude of an interelectrode electromotive force detected by electrodes 2a and 2b in each of a plurality of states with different phase differences between the exciting currents and obtains a phase difference between the exciting currents corresponding to the amplitude having a predetermined value. On the basis of the phase difference obtained by the signal conversion unit 5b, a flow rate output unit 6b calculates the flow rate of a fluid to be measured.

This embodiment corresponds to a structure in which b1=b2 in equation (27) described above. For the descriptive convenience, b1=b2=b. The first and second exciting coils 3a and 3b can have any arrangement as long as b1=b2 can hold. The exciting coils can be arranged either symmetrically as in the second embodiment, or asymmetrically as in the third or fourth embodiment. Exciting currents to be supplied from the power supply unit 4b to the first and second exciting coils 3a and 3b can have either the same amplitude or different amplitudes.

A magnetic field B1 generated from the first exciting coil 3a when the exciting current is supplied from the power supply unit 4b is given by equation (44). A magnetic field B2 generated from the second exciting coil 3b is given by equation (45).

When b1=b2=b in equation (27), an interelectrode electromotive force Eac is given by equation (46). Four vectors representing the interelectrode electromotive force Eac have a geometrical relationship shown in FIG. 13 described in the fifth embodiment. The principle of the fifth embodiment described with reference to FIGS. 14 to 17 also holds in this embodiment.

Figure 19:
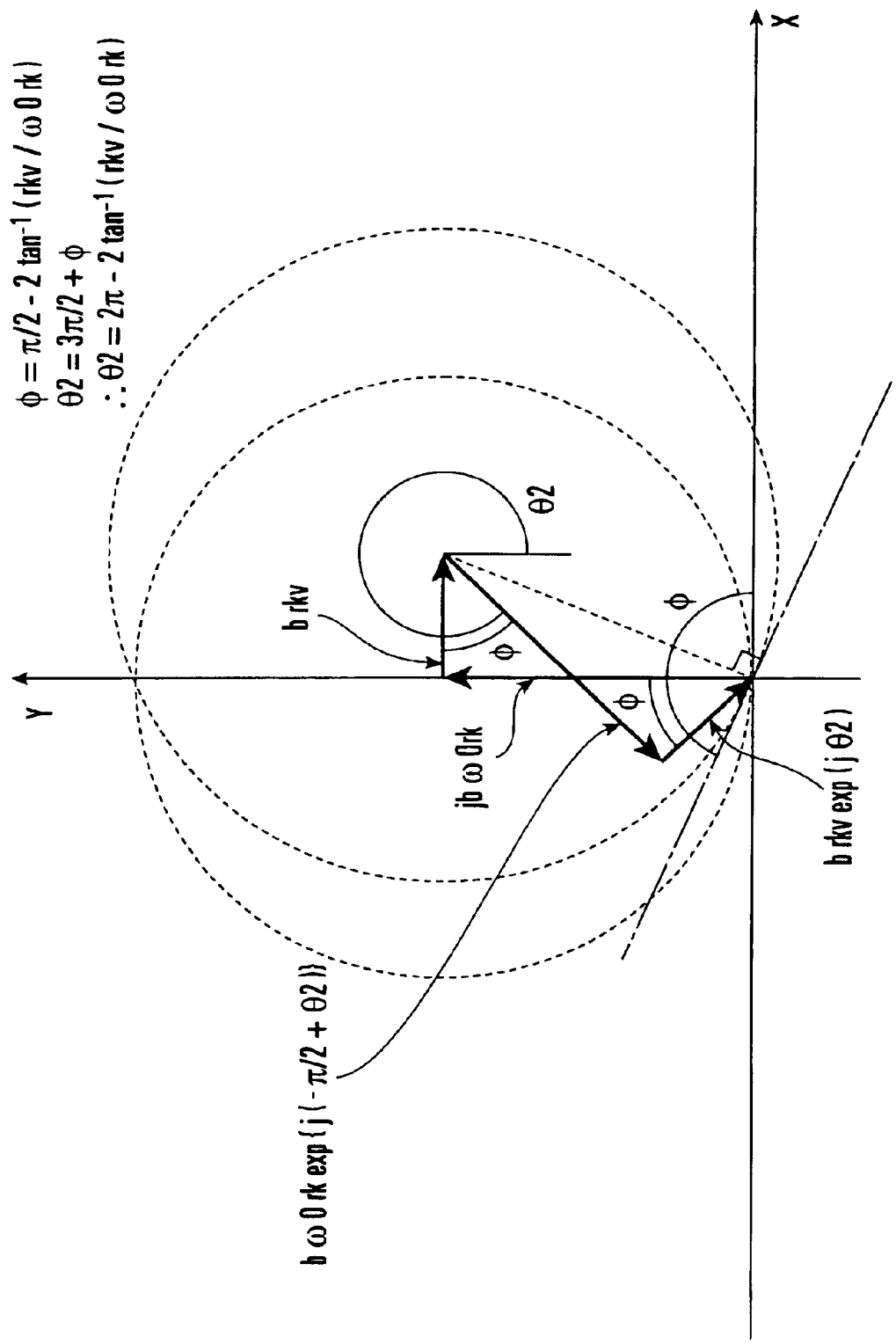
FIG. 19 is a graph showing the principle of flow rate measurement with shift correction in an electromagnetic flowmeter according to the sixth embodiment of the present invention.

FIGS. 19 and 20 show the principle of flow rate measurement in this embodiment. When a phase difference θ2 between the exciting current supplied to the first exciting coil 3a and the exciting current supplied to the second exciting coil 3b is continuously changed, the phase difference θ2, for which the length of the synthetic vector of the four vector of equation (46) becomes 0 (the start point and end point of the synthetic vector are the same), is always present. FIG. 19 shows a state in which the length of the synthetic vector is 0.

At this time, a phase difference $\theta 2_{A=0}$ is given by $$\theta 2_{A=0} = 2\pi - 2\tan^{-1}\{rkv/\omega 0 rk\} \quad (66)$$

Figure 20A:
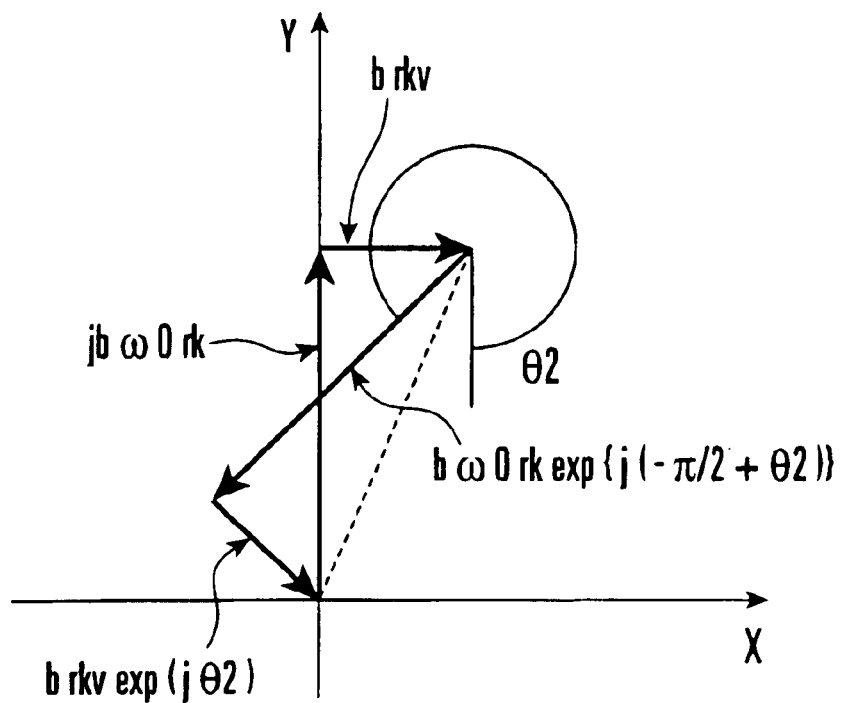
FIGS. 20A and 20B are graphs showing the principle of flow rate measurement with shift correction in the electromagnetic flowmeter according to the sixth embodiment of the present invention.
Figure 20B:
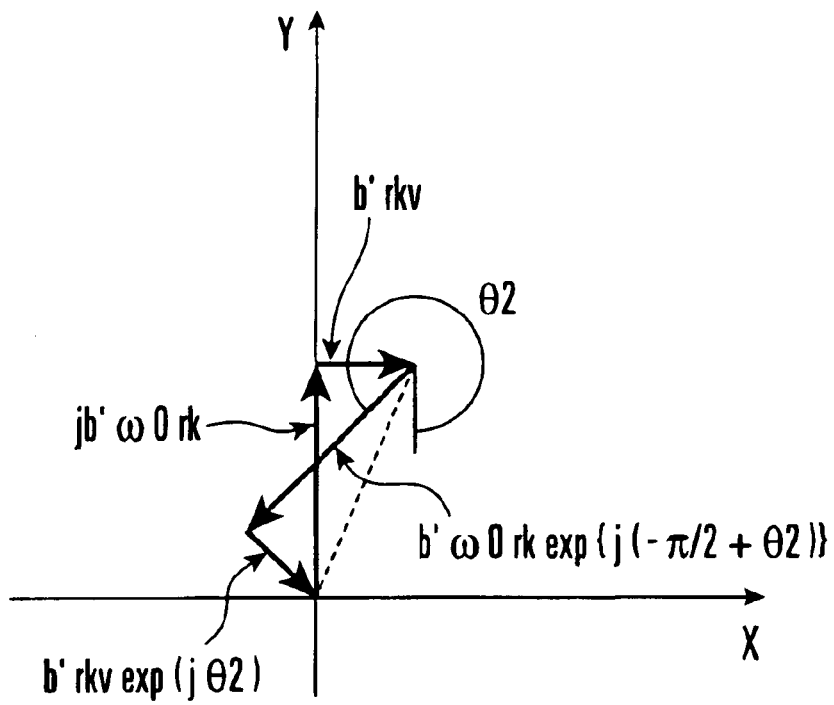

That is, the phase difference $\theta 2_{=0}$ changes in accordance with the flow rate (rkv) of the fluid to be measured. However, the phase difference $\theta 2_{A=0}$ does not depend on an amplitude b of the magnetic fields B1 and B2. As shown in FIGS. 20A and 20B, even when the amplitude b of the magnetic fields B1 and B2 shifts to b', phase difference $\theta 2_{A=0}$ does not change while continuously changing the phase difference θ2, the length of the synthetic vector (the amplitude of the interelectrode electromotive force Eac) is obtained. When the flow rate is detected on the basis of the phase difference $\theta 2_{A=0}$ for which the length becomes 0, the flow rate measurement error due to the influence of the shift can automatically be canceled.

To obtain the flow rate of the fluid to be measured, equation (66) is rewritten to $$rkv = \omega 0 rk \tan\{(2\pi - \theta 2_{A=0})/2\} \quad (67)$$
$$= -\omega 0 rk \tan(\theta 2_{A=0}/2)$$

On the basis of equation (24), equation (67) can be rewritten to $$V = \alpha 3 \times \tan(\theta 2_{A=0}/2) \text{ for } \alpha 3 = -\omega 0/\gamma \quad (68)$$

where α3 is a coefficient predetermined by calibration or the like. The power supply unit 4b continuously switches the phase difference θ2 between the exciting current supplied to the first exciting coil 3a and the exciting current supplied to the second exciting coil 3b. The signal conversion unit 5b obtains the amplitude of the interelectrode electromotive force Eac detected by the electrodes 2a and 2b in each of the plurality of states with different phase differences θ2 and obtains the phase difference $\theta 2_{A=0}$ for which the amplitude Eac has a predetermined value of 0. The flow rate output unit 6b calculates a flow velocity V of the fluid to be measured by using equation (68) on the basis of the phase difference $\theta 2_{A=0}$ obtained by the signal conversion unit 5b. With the above arrangement, the same effect as in the first embodiment can be obtained.

Seventh Embodiment

The seventh embodiment of the present invention will be described next. An electromagnetic flowmeter according to this embodiment has the same arrangement as that of the fifth embodiment, and a description thereof will be made with reference to FIG. 12. A power supply unit 4b of this embodiment supplies exciting currents having the same frequency ω0 and a predetermined phase difference θ2 to first and second exciting coils 3a and 3b. The power supply unit 4b supplies the exciting currents to the first and second exciting coils 3a and 3b while changing the frequency ω0. A signal conversion unit 5b obtains the amplitude of an interelectrode electromotive force detected by electrodes 2a and 2b in each of at least two states with different frequencies ω0 of the exciting currents and obtains the ratio of the amplitudes. On the basis of the amplitude ratio obtained by the signal conversion unit 5b, a flow rate output unit 6b calculates the flow rate of a fluid to be measured.

This embodiment corresponds to a structure in which b1=b2 in equation (27) described above. For the descriptive convenience, b1=b2=b. The first and second exciting coils 3a and 3b can have any arrangement as long as b1=b2 can hold. The exciting coils can be arranged either symmetrically as in the second embodiment or asymmetrically as in the third or fourth embodiment. Exciting currents to be supplied from the power supply unit 4b to the first and second exciting coils 3a and 3b can have either the same amplitude or different amplitudes.

A magnetic field B1 generated from the first exciting coil 3a when the exciting current is supplied from the power supply unit 4b is given by equation (44). A magnetic field B2 generated from the second exciting coil 3b is given by equation (45).

When b1=b2=b in equation (27), an interelectrode electromotive force Eac is given by equation (46). Four vectors representing the interelectrode electromotive force Eac have a geometrical relationship shown in FIG. 13 described in the fifth embodiment. The principle of the fifth embodiment described with reference to FIGS. 14 to 17 also holds in this embodiment.

Figure 21A:
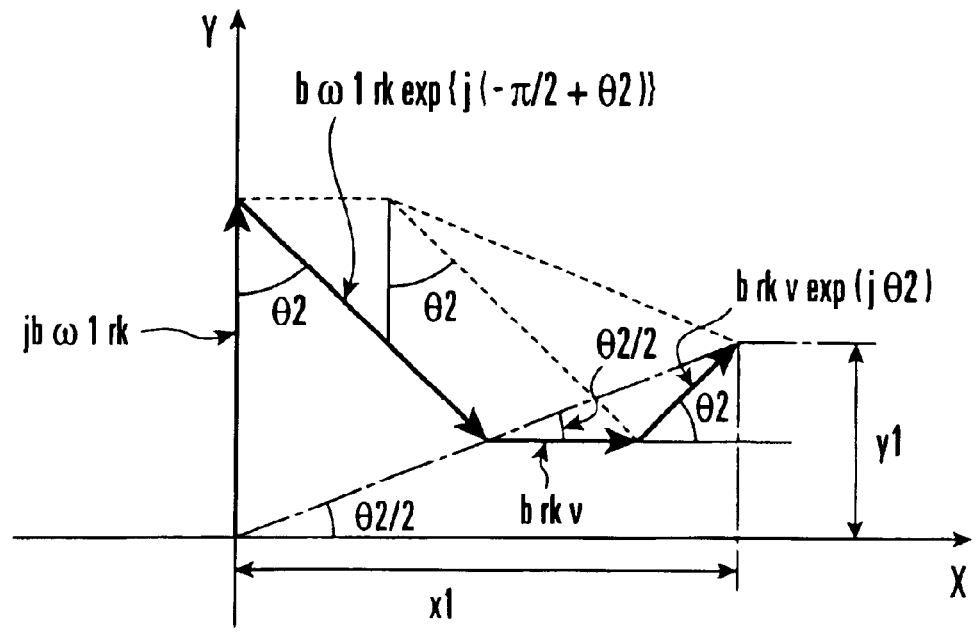
FIGS. 21A and 21B are graphs showing the principle of flow rate measurement with shift correction in an electromagnetic flowmeter according to the seventh embodiment of the present invention.
Figure 21B:
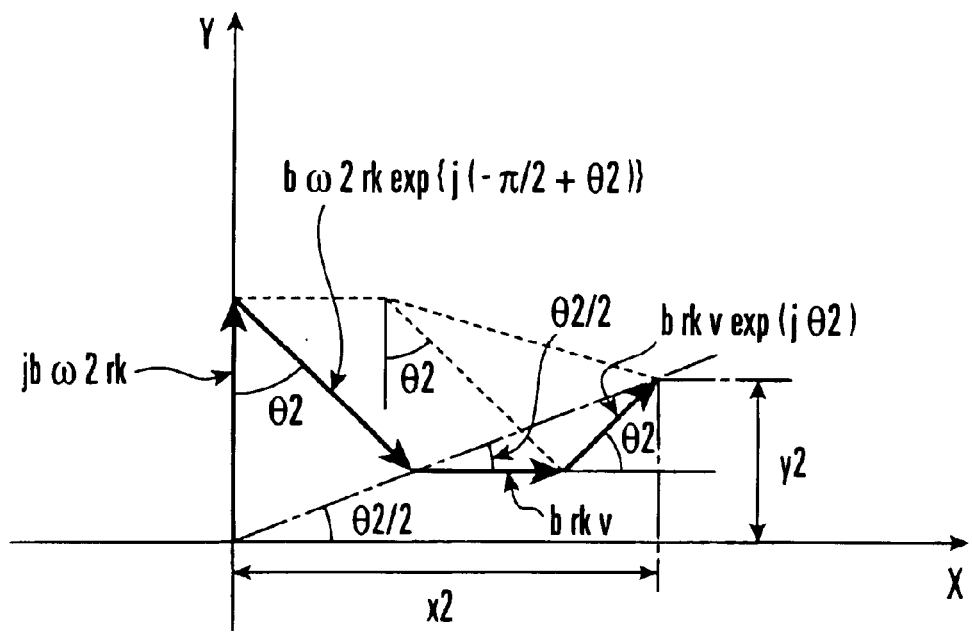

FIGS. 21A and 21B show the principle of flow rate measurement in this embodiment. When the frequency ω0 of the exciting current is ω1, four vectors representing the interelectrode electromotive force Eac have a geometrical relationship shown in FIG. 21A. When the frequency ω0 is ω2, the four vectors representing the interelectrode electromotive force Eac have a geometrical relationship shown in FIG. 21B.

Referring to FIG. 14, a magnitude |BE| of a synthetic vector BE obtained by synthesizing the four vectors of equation (46) is given by equation (54). From equation (54), a ratio Ror of an amplitude $A_{\omega 0=\omega 1}$ of the interelectrode electromotive force Eac when the frequency ω0=ω1 to an amplitude $A_{\omega 0=\omega 2}$ of the interelectrode electromotive force Eac when the frequency ω0=ω2 is given by $$Ror = A_{\omega 0=\omega 1} / A_{\omega 0=\omega 2} \quad (69)$$

-continued $$= \{2b\omega 1 rk\sin(\theta 2/2) + 2brkv\cos(\theta 2/2)\}/$$

$$\{2b\omega 2rk\sin(\theta 2/2) + 2brkv\cos(\theta 2/2)\}$$

$$= \{\omega 1 rk\sin(\theta 2/2) + rkv\cos(\theta 2/2)\}/$$

$$\{\omega 2rk\sin(\theta 2/2) + rkv\cos(\theta 2/2)\}$$

Equation (69) representing the ratio Ror has no term of an amplitude b of the magnetic fields B1 and B2. For this reason, even when the amplitude b of the magnetic fields B1 and B2 shifts, the ratio Ror does not change. Hence, while switching is executed by the power supply unit 4b such that the frequency $\omega 0$ of the exciting currents supplied to the first and second exciting coils 3a and 3b takes the two values $\omega 1$ and $\omega 2$, the amplitude of the interelectrode electromotive force Eac is obtained in correspondence with each of the two value. When the flow rate is detected on the basis of the amplitude ratio Ror, the flow rate measurement error due to the influence of the shift can automatically be canceled.

Equation (69) can be rewritten to $$rkv=rk\{(Ror\omega 2-\omega 1)\sin(\theta 2/2)\}/\{(1-Ror)\cos(\theta 2/2)\} \quad (70)$$

From equation (24), equation (70) can be rewritten to $$V=\alpha 4\times\{(Ror\omega 2-\omega 1)\sin(\theta 2/2)\}/\{(1-Ror)\cos(\theta 2/2)\} \text{ for } \alpha 4=1/\gamma \quad (71)$$

where $\alpha 4$ (or $\gamma$) is a coefficient predetermined by calibration or the like. With the above processing, the formula of a flow velocity V when the exciting currents with the frequency $\omega 0=\omega 1$ and the exciting currents with the frequency $\omega 0=\omega 2$ are supplied to the first and second exciting coils 3a and 3b can be obtained. The power supply unit 4b supplies the exciting currents with the frequency $\omega 0=\omega 1$ and the exciting currents with the frequency $\omega 0=\omega 2$ to the first and second exciting coils 3a and 3b. The signal conversion unit 5b obtains the amplitude of the interelectrode electromotive force Eac detected by the electrodes 2a and 2b in each of the two states with different frequencies $\omega 0$ of the exciting currents and obtains the ratio Ror of the amplitudes. The flow rate output unit 6b calculates the flow velocity V of the fluid to be measured by using equation (71) on the basis of the amplitude ratio Ror obtained by the signal conversion unit 5b. With the above arrangement, the same effect as in the first embodiment can be obtained.

Eighth Embodiment

The eighth embodiment of the present invention will be described next. An electromagnetic flowmeter according to this embodiment has the same arrangement as that of the seventh embodiment, and a description thereof will be made with reference to FIG. 12. In the seventh embodiment, the flow velocity V of the fluid to be measured is calculated by using the ratio Ror of the amplitudes of the interelectrode electromotive force Eac. A flow velocity V of a fluid to be measured may be calculated by using a ratio Rvx of the real axis components of amplitudes.

A magnitude x of the real axis component of the amplitude of an interelectrode electromotive force Eac is given by $$x=b\omega 0 rk \sin(\theta 2)+brkv\cos(\theta 2) \quad (72)$$

From equation (72), the ratio Rvx of a magnitude x1 of the real axis component of the amplitude of the interelectrode electromotive force Eac when a frequency $\omega 0$ of the exciting current is $\omega 1$ to a magnitude x2 of the real axis component of the amplitude of the interelectrode electromotive force Eac when the frequency $\omega 0=\omega 2$ is given by $$Rvx = x1/x2 \quad (73)$$

$$= \{\omega 1 rk\sin(\theta 2) + rkv + rkv\cos(\theta 2)\}/$$

$$\{\omega 2rk\sin(\theta 2) + rkv + rkv\cos(\theta 2)\}$$

Equation (73) representing the ratio Rvx has no term of an amplitude b of magnetic fields B1 and B2. For this reason, even when the amplitude b of the magnetic fields B1 and B2 shifts, the ratio Rvx does not change. Equation (73) can be rewritten to $$rkv=rk\{(Rvx\omega 2-\omega 1)\sin(\theta 2)\}/[(1-Rvx)\{1+\cos(\theta 2)\}] \quad (74)$$

From equation (24), equation (74) can be rewritten to $$V=\alpha 4\times\{(Rvx\omega 2-\omega 1)\sin(\theta 2)\}/[(1-Rvx)\{1+\cos(\theta 2)\}] \text{ for } \alpha 4=1/\gamma \quad (75)$$

A power supply unit 4b supplies exciting currents with the frequency $\omega 0=\omega 1$ and the exciting currents with the frequency $\omega 0=\omega 2$ to first and second exciting coils 3a and 3b. A signal conversion unit 5b obtains the amplitude of the real axis component of the interelectrode electromotive force Eac detected by electrodes 2a and 2b in each of the two states with different frequencies $\omega 0$ of the exciting currents and obtains the ratio Rvx of the real axis components. A flow rate output unit 6b calculates the flow velocity V of the fluid to be measured by using equation (75) on the basis of the amplitude ratio Rvx obtained by the signal conversion unit 5b. With the above arrangement, the same effect as in the first embodiment can be obtained.

Ninth Embodiment

The ninth embodiment of the present invention will be described next. An electromagnetic flowmeter according to this embodiment has the same arrangement as that of the seventh embodiment, and a description thereof will be made with reference to FIG. 12. In the seventh embodiment, the flow velocity V of the fluid to be measured is calculated by using the ratio Ror of the amplitudes of the interelectrode electromotive force Eac. A flow velocity V of a fluid to be measured may be calculated by using a ratio Rvy of the imaginary axis components of amplitudes.

A magnitude y of the imaginary axis component of the amplitude of an interelectrode electromotive force Eac is given by $$y=b\omega 0 rk-b\omega 0 rk \cos(\theta 2)+brkv \sin(\theta 2) \quad (76)$$

From equation (76), the ratio Rvy of a magnitude y1 of the imaginary axis component of the amplitude of the interelectrode electromotive force Eac when a frequency $\omega 0$ of the exciting current is $\omega 1$ to a magnitude y2 of the imaginary axis component of the amplitude of the interelectrode electromotive force Eac when the frequency $\omega 0=\omega 2$ is given by $$Rvx = y1/y2 \quad (77)$$

$$= \{\omega 1 rk - \omega 1 rk\cos(\theta 2) + rkv\sin(\theta 2)\}/$$

$$\{\omega 2rk - \omega 2rk\cos(\theta 2) + rkv\sin(\theta 2)\}$$

Equation (77) representing the ratio Rvy has no term of an amplitude b of magnetic fields B1 and B2. For this reason, even when the amplitude b of the magnetic fields B1 and B2 shifts, the ratio Rvy does not change. Equation (77) can be rewritten to $$rkv - rk[(Rvy\omega 2 - \omega 1)\{1 - \cos(\theta 2)\}]/\{(\oplus - Rvy)\sin(\theta 2)\} \quad (78)$$

From equation (24), equation (78) can be rewritten to $$V = \alpha 4 \times [(Rvy\omega 2 - \omega 1)\{1 - \cos(\theta 2)\}]/\{(1 - Rvy)\sin(\theta 2)\} \text{ for } \alpha 4 = 1/\gamma \quad (79)$$

A power supply unit 4b supplies exciting currents with the frequency $\omega 0 = \omega 1$ and the exciting currents with the frequency $\omega 0 = \omega 2$ to first and second exciting coils 3a and 3b. A signal conversion unit 5b obtains the amplitude of the imaginary axis component of the interelectrode electromotive force Eac detected by electrodes 2a and 2b in each of the two states with different frequencies $\omega 0$ of the exciting currents and obtains the ratio Rvy of the imaginary axis components. A flow rate output unit 6b calculates the flow velocity V of the fluid to be measured by using equation (79) on the basis of the amplitude ratio Rvy obtained by the signal conversion unit 5b. With the above arrangement, the same effect as in the first embodiment can be obtained.

As a characteristic feature of the seventh to ninth embodiments, a plurality of predetermined discrete values are used for the frequency $\omega$ of the exciting current. The frequency $\omega 0$ is not limited to two values.

10th Embodiment

The 10th embodiment of the present invention will be described next. An electromagnetic flowmeter according to this embodiment has the same arrangement as that of the fifth embodiment, and a description thereof will be made with reference to FIG. 12. A power supply unit 4b of this embodiment supplies exciting currents having the same frequency $\omega 0$ and a predetermined phase difference $\theta 2$ to first and second exciting coils 3a and 3b. The power supply unit 4b supplies the exciting currents to the first and second exciting coils 3a and 3b while continuously switching the frequency $\omega 0$. A signal conversion unit 5b obtains the amplitude of an interelectrode electromotive force detected by electrodes 2a and 2b in each of a plurality of states with different frequencies $\omega 0$ of the exciting currents and obtains the frequency $\omega 0$ for which the amplitude has a predetermined value. On the basis of the frequency $\omega 0$ obtained by the signal conversion unit 5b, a flow rate output unit 6b calculates the flow rate of a fluid to be measured.

This embodiment corresponds to a structure in which b1=b2 in equation (27) described above. For the descriptive convenience, b1=b2=b. The first and second exciting coils 3a and 3b can have any arrangement as long as b1=b2 can hold. The exciting coils can be arranged either symmetrically as in the second embodiment, or asymmetrically as in the third or fourth embodiment. Exciting currents to be supplied from the power supply unit 4b to the first and second exciting coils 3a and 3b can have either the same amplitude or different amplitudes.

A magnetic field B1 generated from the first exciting coil 3a when the exciting current is supplied from the power supply unit 4b is given by equation (44). A magnetic field B2 generated from the second exciting coil 3b is given by equation (45).

When b1=b2=b in equation (27), an interelectrode electromotive force Eac is given by equation (46). Four vectors representing the interelectrode electromotive force Eac have a geometrical relationship shown in FIG. 13 described in the fifth embodiment. The principle of the fifth embodiment described with reference to FIGS. 14 to 17 also holds in this embodiment.

Figure 22A:
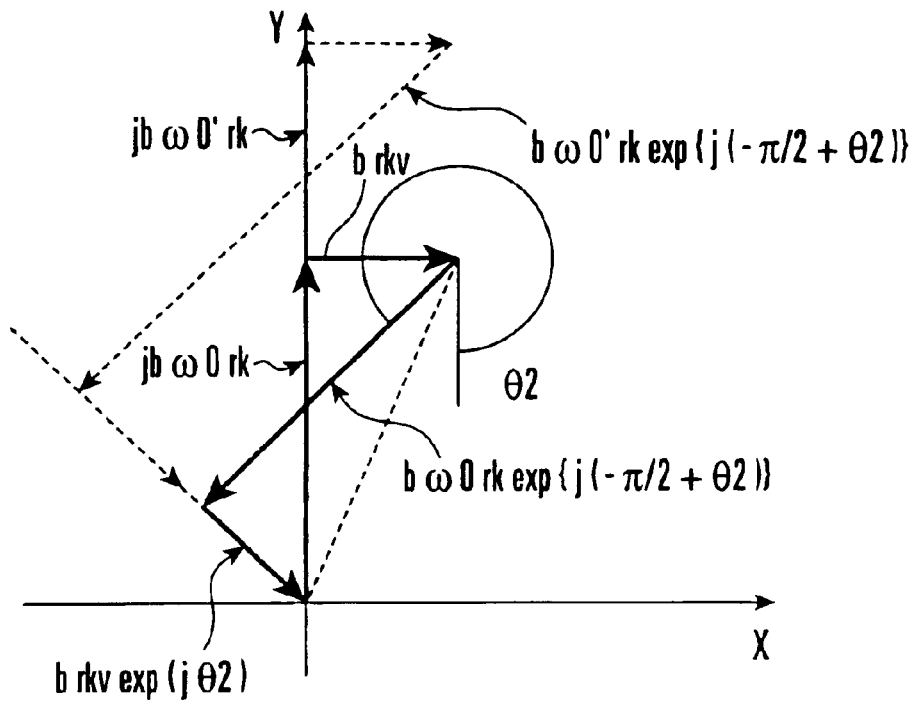
FIGS. 22A and 22B are graphs showing the principle of flow rate measurement with shift correction in an electromagnetic flowmeter according to the 10th embodiment of the present invention.
Figure 22B:
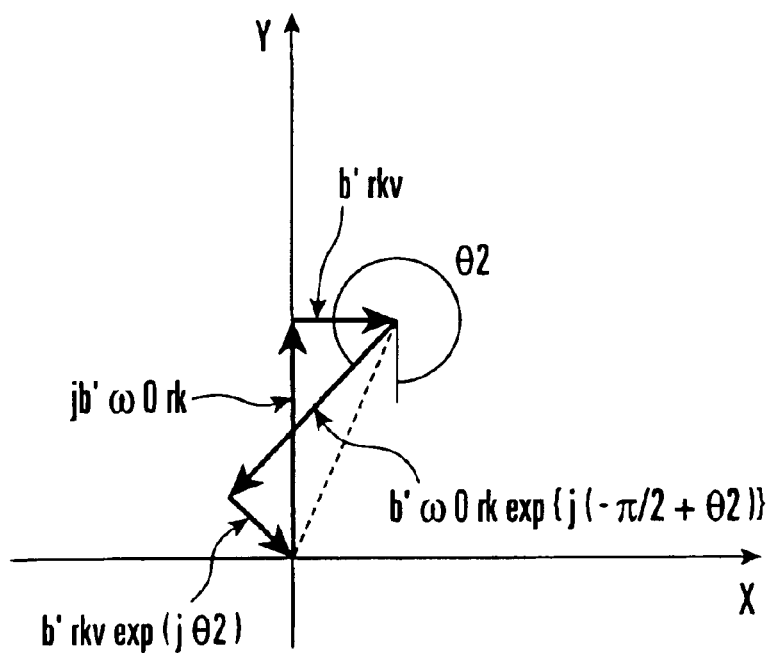

FIGS. 22A and 22B show the principle of flow rate measurement in this embodiment. When the phase difference $\theta 2$ is constant, and the frequency $\omega 0$ is continuously changed, the phase difference $\theta 2$, for which the length of the synthetic vector of four vector of equation (46) becomes 0, is always present. The frequency at this time is defined as $\omega 0_{A=0}$. The frequency, $\omega 0_{A=0}$ is given by $$\omega 0_{A=0} = -rkv/\{rk \tan(\theta 2/2)\} \quad (80)$$

Equation (80) representing the frequency $\omega 0_{A=0}$ has no term of an amplitude b of the magnetic fields B1 and B2. For this reason, even when the amplitude b of the magnetic fields B1 and B2 shifts to b', the frequency $\omega 0_{A=0}$ does not change. The length of the synthetic vector remains 0, as shown in FIGS. 22A and 22B. Hence, while continuously changing the frequency $\omega 0$, the amplitude of the interelectrode electromotive force Eac is obtained. When the flow rate is detected on the basis of the frequency $\omega 0_{A=0}$ for which the amplitude has a predetermined value, the flow rate measurement error due to the influence of the shift can automatically be canceled.

To obtain the flow rate of the fluid to be measured, equation (80) is rewritten to $$rkv = -\omega 0_{A=0} rk \tan(\theta 2/2) \quad (81)$$

On the basis of equation (24), equation (91) can be rewritten to $$V = \alpha 5 \times \omega 0_{A=0} \tan(\theta 2/2) \text{ for } \alpha 5 = -1/\gamma \quad (82)$$

where $\alpha 5$ is a coefficient predetermined by calibration or the like. The power supply unit 4b continuously switches the frequency $\omega 0$ of the exciting currents supplied to the first and second exciting coils 3a an 3b. A signal conversion unit 5b obtains the amplitude of the interelectrode electromotive force Eac detected by electrodes 2a and 2b in each of the plurality of states with different frequencies $\omega 0$ and obtains the frequency $\omega 0_{A=0}$ for which the amplitude Eac has a predetermined value of 0. A flow rate output unit 6b calculates a flow velocity V of the fluid to be measured by using equation (82) on the basis of the frequency $\omega 0_{A=0}$ obtained by the signal conversion unit 5b. With the above arrangement, the same effect as in the first embodiment can be obtained.

In the sixth and 10th embodiments, the predetermined value is set to 0 as the simplest detailed example. However the present invention is not limited to this. The basic principle of the sixth and 10th embodiments can also be applied to any other amplitude except 0.

In the first to 10th embodiments, in-phase component noise can be removed. Hence, the rectangular wave exciting method need not be used. Since the sine wave exciting method which uses a sine wave for an exciting current can be used, high-frequency excitation can be executed. When high-frequency excitation is used, 1/f noise can be removed, and the response to a change in flow rate can be increased.

Figure 23:
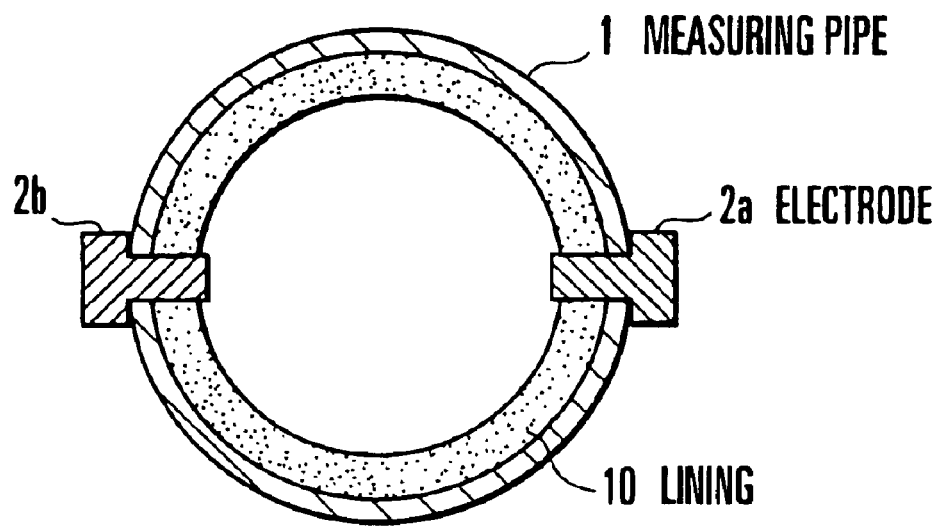
FIG. 23 is a sectional view showing an example of the electrode used in the electromagnetic flowmeter according to the present invention.
Figure 24:
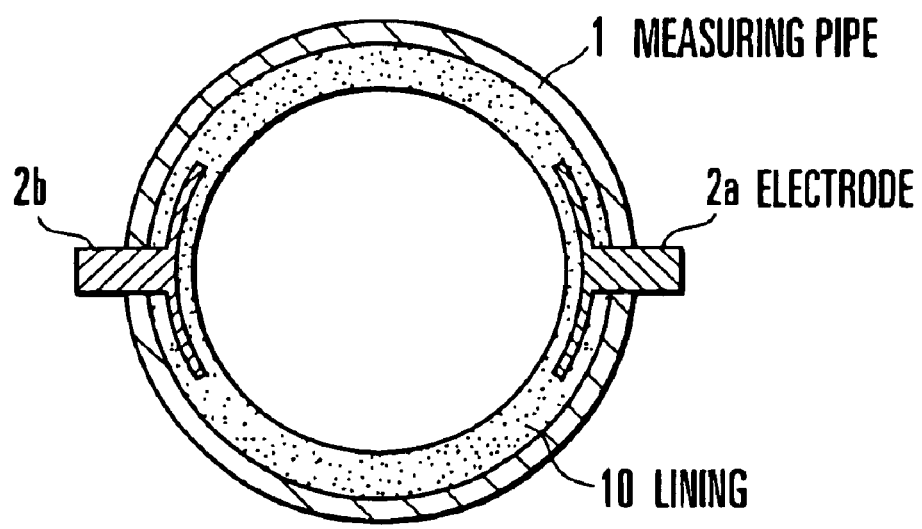
FIG. 24 is a sectional view showing another example of the electrode used in the electromagnetic flowmeter according to the present invention.

As the electrodes 2a and 2b used in the first to 10th embodiments, electrodes which are exposed from the inner wall of the measuring pipe 1 and come into contact with the fluid to be measured may be used, as shown in FIG. 23. Alternatively, as shown in FIG. 24, capacitively coupled electrodes which do not come into contact with the fluid to be measured may be used. When capacitively coupled electrodes are used, the electrodes 2a and 2b are covered with a lining 10 made of ceramic or Teflon and formed on the inner wall of the measuring pipe 1.

In the first to 10th embodiments, the two electrodes 2a and 2b are used. However, the present invention is not limited to this. The present invention can also be applied to an electromagnetic flowmeter having only one electrode. When only one electrode is used, a ground ring is provided in the measuring pipe 1 to set the potential of the fluid to be measured to the ground potential. An electromotive force (the potential difference from the ground potential) generated in the single electrode is detected by the signal conversion unit 5 or 5b. When the two electrodes 2a and 2b are used, the electrode axis EAX forms a straight line that connects the electrodes 2a and 2b. When only one electrode is used, it is assumed that a virtual electrode is arranged on the plane PLN including the single real electrode at a position opposite to the real electrode with respect to the measuring pipe axis PAX. The straight line that connects the real electrode and the virtual electrode at this time corresponds to the electrode axis EAX.

The means for obtaining a phase difference φ in the signal conversion unit 5 and the flow rate output unit 6 in the first embodiment, the means for obtaining the phase difference φ in the signal conversion unit 5 and the flow rate output unit 6a in the second to fourth embodiments, the means for obtaining the ratio R in the signal conversion unit 5b and the flow rate output unit 6b in the fifth embodiment, the means for obtaining the phase difference $\theta 2_{A=0}$ in the signal conversion unit 5b and the flow rate output unit 6b in the sixth embodiment, the means for obtaining the ratio Ror, Rvx, or Rvy in the signal conversion unit 5b and the flow rate output unit 6b in the seventh to ninth embodiments, and the means for obtaining the frequency $\omega 0_{A=0}$ in the signal conversion unit 5b and the flow rate output unit 6b in the 10th embodiment can be implemented by, e.g., a computer.

INDUSTRIAL APPLICABILITY

As described above, the present invention is suitable for an electromagnetic flowmeter using a sine wave exciting method which is readily affected by in-phase component noise.

What is claimed is:

1. An electromagnetic flowmeter characterized by comprising:
    a measuring pipe through which a fluid to be measured flows;
    an electrode which is arranged in said measuring pipe and detects an electromotive force generated by a magnetic field changing over time and applied to the fluid and flow of the fluid;
    an asymmetrical exciting unit which applies asymmetrical magnetic fields to the fluid on both sides of a plane serving as a boundary in said measuring pipe, the plane including said electrode, being perpendicular to an axial direction of said measuring pipe, and being defined as the boundary in said measuring pipe;
    a signal conversion unit which obtains, from an electromotive force detected by said electrode, an asymmetrical exciting characteristic parameter which depends on a flow rate of the fluid and does not depend on a flow rate measurement error; and
    a flow rate output unit which calculates the flow rate of the fluid for which the flow rate measurement error has been corrected on the basis of the asymmetrical exciting characteristic parameter.

2. An electromagnetic flowmeter according to claim 1, characterized in that
    said asymmetrical exciting unit comprises
    an exciting coil which is arranged at a position separated from the plane by an offset distance, and
    a power supply unit which supplies an exciting current to said exciting coil.

3. An electromagnetic flowmeter according to claim 1, characterized in that
    said signal conversion unit obtains as the asymmetrical exciting characteristic parameter, a phase difference between an exciting current supplied to an exciting coil of said asymmetrical exciting unit and the electromotive force detected by said electrode, and
    said flow rate output unit calculates the flow rate of the fluid on the basis of the phase difference obtained by said signal conversion unit.

4. An electromagnetic flowmeter according to claim 1, characterized in that
    said asymmetrical exciting unit comprises
    a first exciting coil which is arranged at a position separated from the plane by an offset distance,
    a second exciting coil which is arranged at a position different from that of said first exciting coil, and
    a power supply unit which supplies exciting currents having the same phase to said first exciting coil and said second exciting coil, and
    in a magnetic field generated from said first exciting coil and a magnetic field generated from said second exciting coil, magnetic field components which are perpendicular to both of an axial direction of said electrode and the axial direction of said measuring pipe have the same phase and different amplitudes on the axis of said electrode.

5. An electromagnetic flowmeter according to claim 1, characterized in that
    said asymmetrical exciting unit comprises
    a first exciting coil which is arranged at a position separated from the plane by an offset distance,
    a second exciting coil which is arranged at a position different from that of said first exciting, coil, and
    a power supply unit which supplies exciting currents to said first exciting coil and said second exciting coil while changing a phase difference between the exciting current supplied to said first exciting coil and the exciting current supplied to said second exciting coil, and
    in a magnetic field generated from said first exciting coil and a magnetic field generated from said second exciting coil, magnetic field components which are perpendicular to both of an axial direction of said electrode and the axial direction of said measuring pipe have the same amplitude on the axis of said electrode, and the phase difference between the magnetic field component of said first exciting coil and the magnetic field component of said second exciting coil takes at least two values.

6. An electromagnetic flowmeter according to claim 1, characterized in that
    said signal conversion unit obtains an amplitude of the electromotive force detected by said electrode for each of at least two states with different phase differences between the exciting currents supplied to said two exciting coils of said asymmetrical exciting unit and obtains a ratio of the amplitudes as the asymmetrical exciting characteristic parameter, and
    said flow rate output unit calculates the flow rate of the fluid on the basis of the ratio of the amplitudes obtained by said signal conversion unit.

7. An electromagnetic flowmeter according to claim 1, characterized in that
    said asymmetrical exciting unit comprises a first exciting coil which is arranged at a position separated from the plane by an offset distance, a second exciting coil which is arranged at a position different from that of said first exciting coil, and a power supply unit which supplies exciting currents to said first exciting coil and said second exciting coil while continuously switching a phase difference between the exciting current supplied to said first exciting coil and the exciting current supplied to said second exciting coil, and in a magnetic field generated from said first exciting coil and a magnetic field generated from said second exciting coil, magnetic field components which are perpendicular to both of an axial direction of said electrode and the axial direction of said measuring pipe have the same amplitude on the axis of said electrode, and the phase difference between the magnetic field component of said first exciting coil and the magnetic field component of said second exciting coil continuously switches.

8. An electromagnetic flowmeter according to claim 1, characterized in that said signal conversion unit obtains an amplitude of the electromotive force detected by said electrode for each of a plurality of states with different phase differences between the exciting currents supplied to said two exciting coils of said asymmetrical exciting unit and obtains, as the asymmetrical exciting characteristic parameter, the phase difference for which the amplitude has a predetermined value, and said flow rate output unit calculates the flow rate of the fluid on the basis of the phase difference obtained by said signal conversion unit.

9. An electromagnetic flowmeter according to claim 1, characterized in that said asymmetrical exciting unit comprises a first exciting coil which is arranged at a position separated from the plane by an offset distance, a second exciting coil which is arranged at a position different from that of said first exciting coil, and a power supply unit which supplies exciting currents having the same frequency and a predetermined phase difference to said first exciting coil and said second exciting coil while changing the frequency, and in a magnetic field generated from said first exciting coil and a magnetic field generated from said second exciting coil, magnetic field components which are perpendicular to both of an axial direction of said electrode and the axial direction of said measuring pipe have the same amplitude, same frequency, and the predetermined phase difference on the axis of said electrode, and the frequency of the magnetic field component switches between at least two values.

10. An electromagnetic flowmeter according to claim 1, characterized in that said signal conversion unit obtains an amplitude of the electromotive force detected by said electrode for each of at least two states in which the frequency of the exciting currents supplied to said two exciting coils of said asymmetrical exciting unit switches and obtains a ratio of the amplitudes as the asymmetrical exciting characteristic parameter, and said flow rate output unit calculates the flow rate of the fluid on the basis of the ratio of the amplitudes obtained by said signal conversion unit.

11. An electromagnetic flowmeter according to claim 1, characterized in that said asymmetrical exciting unit comprises a first exciting coil which is arranged at a position separated from the plane by an offset distance, a second exciting coil which is arranged at a position different from that of said first exciting coil, and a power supply unit which supplies exciting currents having the same frequency and a predetermined phase difference to said first exciting coil and said second exciting coil while continuously switching the frequency, and in a magnetic field generated from said first exciting coil and a magnetic field generated from said second exciting coil, magnetic field components which are perpendicular to both of an axial direction of said electrode and the axial direction of said measuring pipe have the same amplitude, same frequency, and the predetermined phase difference on the axis, of said electrode, and the frequency of the magnetic field component continuously switches.

12. An electromagnetic flowmeter according to claim 1, characterized in that said signal conversion unit obtains an amplitude of the electromotive force detected by said electrode for each of a plurality of states in which the frequency of the exciting currents supplied to said two exciting coils of said asymmetrical exciting unit switches and obtains, as the asymmetrical exciting characteristic parameter, the frequency of the exciting current for which the amplitude has a predetermined value, and said flow rate output unit calculates the flow rate of the fluid on the basis of the frequency obtained by said signal conversion unit.

13. An electromagnetic flowmeter characterized by comprising:

a measuring pipe through which a fluid to be measured flows;

an electrode which is arranged in said measuring pipe and detects an electromotive force generated by a magnetic field applied to the fluid and flow of the fluid;

an exciting coil which is arranged at a position separated from a plane by an offset distance and applies asymmetrical magnetic fields to the fluid on both sides of the plane serving as a boundary in said measuring pipe, the plane including said electrode, being perpendicular to an axial direction of said measuring pipe, and being defined as the boundary in said measuring pipe;

a power supply unit which supplies an exciting current to said exciting coil;

a signal conversion unit which obtains a phase difference between the exciting current and an electromotive force detected by said electrode; and a flow rate output unit which calculates a flow rate of the fluid on the basis of the phase difference obtained by said signal conversion unit.

14. An electromagnetic flowmeter characterized by comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged at a position separated from a plane by an offset distance, the plane including said electrode, being perpendicular to an axial direction of said measuring pipe, and being defined as the boundary in said measuring pipe;

a second exciting coil which is arranged at a position different from that of said first exciting coil;

a power supply unit which supplies exciting currents having the same phase to said first exciting coil and said second exciting coil;

a signal conversion unit which obtains a phase difference between the exciting current and an electromotive force detected by said electrode; and a flow rate output unit which calculates a flow rate of the fluid on the basis of the phase difference obtained by said signal conversion unit, wherein in a magnetic field generated from said first exciting coil and a magnetic field generated from said second exciting coil, magnetic field components which are perpendicular to both of an axial direction of said electrode and the axial direction of said measuring pipe have the same phase and different amplitudes on the axis of said electrode.

15. An electromagnetic flowmeter according to any one of claims 3, 13, and 14 characterized in that on the basis of the phase difference $\phi$ obtained by said signal conversion unit, said flow rate output unit calculates the flow rate of the fluid by $\alpha 1 \times \tan(\pi/2)$ ($\alpha 1$ is a coefficient).

16. An electromagnetic flowmeter characterized by comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged at a position separated from a plane by an offset distance, the plane including said electrode, being perpendicular to an axial direction of said measuring pipe, and being defined as the boundary in said measuring pipe;

a second exciting coil which is arranged at a position different from that of said first exciting coil;

a power supply unit which supplies exciting currents to said first exciting coil and said second exciting coil while changing a phase difference between the exciting current supplied to said first exciting coil and the exciting current supplied to said second exciting coil;

a signal conversion unit which obtains an amplitude of the electromotive force detected by said electrode for each of at least two states with different phase differences and obtains a ratio of the amplitudes; and a flow rate output unit which calculates a flow rate of the fluid on the basis of the ratio of the amplitudes obtained by said signal conversion unit, wherein in a magnetic field generated from said first exciting coil and a magnetic field generated from said second exciting coil, magnetic field components which are perpendicular to both of an axial direction of said electrode and the axial direction of said measuring pipe have the same amplitude on the axis of said electrode, and the phase difference between the magnetic field component of said first exciting coil and the magnetic field component of said second exciting coil takes at least two values.

17. An electromagnetic flowmeter according to claim 6 or 16, characterized in that when the phase difference between the exciting current supplied to said first exciting coil and the exciting current supplied to said second exciting coil takes two values $2\chi$ and $2\psi$ ($\chi$ and $\psi$ are different real numbers), said flow rate output unit calculates, on the basis of a ratio R of the amplitudes obtained by said signal conversion unit, the flow rate of the fluid by $\alpha 2 \times \{(R \sin \psi - \sin \chi)/(R \cos \psi - \cos \chi)\}$ ($\theta 2$ is a coefficient).

18. An electromagnetic flowmeter characterized by comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged at a position separated from a plane by an offset distance, the plane including said electrode, being perpendicular to an axial direction of said measuring pipe, and being defined as the boundary in said measuring pipe;

a second exciting coil which is arranged at a position different from that of said first exciting coil;

a power supply unit which supplies exciting currents to said first exciting coil and said second exciting coil while continuously switching a phase difference between the exciting current supplied to said first exciting coil and the exciting current supplied to said second exciting coil;

a signal conversion unit which obtains an amplitude of the electromotive force detected by said electrode for each of a plurality of states with different phase differences and obtains the phase difference for which the amplitude has a predetermined value; and a flow rate output unit which calculates a flow rate of the fluid on the basis of the phase difference obtained by said signal conversion unit, wherein in a magnetic field generated from said first exciting coil and a magnetic field generated from said second exciting coil, magnetic field components which are perpendicular to both of an axial direction of said electrode and the axial direction of said measuring pipe have the same amplitude on the axis of said electrode and the phase difference between the magnetic field component of said first exciting coil and the magnetic field component of said second exciting coil continuously switches.

19. An electromagnetic flowmeter according to claim 8 or 18, characterized in that on the basis of the phase difference $\theta 2$ obtained by said signal conversion unit, said flow rate output unit calculates the flow rate of the fluid by $\alpha 3 \times \tan(\theta 2/2)$ ($\alpha 3$ is a coefficient).

20. An electromagnetic flowmeter characterized by comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged at a position separated from a plane by an offset distance, the plane including said electrode, being perpendicular to an axial direction of said measuring pipe, and being defined as the boundary in said measuring pipe;

a second exciting coil which is arranged at a position different from that of said first exciting coil;

a power supply unit which supplies exciting currents having the same frequency and a predetermined phase difference to said first exciting coil and said second exciting coil while changing the frequency;

a signal conversion unit which obtains an amplitude of the electromotive force detected by said electrode for each of at least two states with different frequencies and obtains a ratio of the amplitudes; and a flow rate output unit which calculates a flow rate of the fluid on the basis of the ratio of the amplitudes obtained by said signal conversion unit, wherein in a magnetic field generated from said first exciting coil and a magnetic field generated from said second exciting coil, magnetic field components which are perpendicular to both of an axial direction of said electrode and the axial direction of said measuring pipe have the same amplitude, same frequency, and the predetermined phase difference on the axis of said electrode, and the frequency of the magnetic field component switches between at least two values.

21. An electromagnetic flowmeter according to claim 10 or 20, characterized in that when the frequency of the exciting currents supplied to said first and second exciting coils switches between two values $\omega 1$ and $\omega 2$, said flow rate output unit calculates, on the basis of a ratio Ror of the amplitudes obtained by said signal conversion unit, the flow rate of the fluid by $\alpha 4 \times \{(Ror\omega 2 - \omega 1)\sin(\theta 2/2)\}/\{(1-Ror)\cos(\theta 2/2)\}$ ($\alpha 4$ is a coefficient).

22. An electromagnetic flowmeter characterized by comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged at a position separated from a plane by an offset distance, the plane including said electrode, being perpendicular to an axial direction of said measuring pipe, and being defined as the boundary in said measuring pipe;

a second exciting coil which is arranged at a position different from that of said first exciting coil;

a power supply unit which supplies exciting currents having the same frequency and a predetermined phase difference to said first exciting coil and said second exciting coil while continuously switching the frequency;

a signal conversion unit which obtains an amplitude of the electromotive force detected by said electrode for each of a plurality of states with different frequencies and obtains the frequency for which the amplitude has a predetermined value; and a flow rate output unit which calculates a flow rate of the fluid on the basis of the frequency obtained by said signal conversion unit, wherein in a magnetic field generated from said first exciting coil and a magnetic field generated from said second exciting coil, magnetic field components which are perpendicular to both of an axial direction of said electrode and the axial direction of said measuring pipe have the same amplitude, same frequency, and the predetermined phase difference on the axis of said electrode, and the frequency of the magnetic field component continuously switches.

23. An electromagnetic flowmeter according to claim 12 or 22, characterized in that on the basis of the phase difference $\theta 2$ between the exciting current supplied to said first exciting coil and the exciting current supplied to said second exciting coil and the frequency $\omega 0$ obtained by said signal conversion unit, said flow rate output unit calculates the flow rate of the, fluid by $\alpha 5 \times \omega 0 \tan(\theta 2/2)$ ($\alpha 5$ is a coefficient).

24. An electromagnetic flowmeter according to any one of claims 1, 13, 14, 16, 18, 20, and 22, characterized in that said electromagnetic flowmeter uses a sine wave exciting method.

25. An electromagnetic flowmeter according to any one of claim 1, 13, 14, 16, 18, 20, and 22, characterized in that the number of said electrodes is one.

* * * * *